United States Patent
Zhao et al.

(10) Patent No.: US 11,156,517 B2
(45) Date of Patent: Oct. 26, 2021

(54) METHOD AND DEVICE FOR DETECTING SWITCHING VALUE OF PRESSURE SWITCH

(71) Applicant: BEIJING CONST INSTRUMENT TECHNOLOGY INC., Beijing (CN)

(72) Inventors: Shichun Zhao, Beijing (CN); Chunying Zhang, Beijing (CN)

(73) Assignee: BEIJING CONST INSTRUMENT TECHNOLOGY INC., Beijing (CN)

( * ) Notice: Subject to any disclaimer, the term of this patent is extended or adjusted under 35 U.S.C. 154(b) by 458 days.

(21) Appl. No.: 16/089,502

(22) PCT Filed: Apr. 27, 2016

(86) PCT No.: PCT/CN2016/080363
§ 371 (c)(1),
(2) Date: Sep. 28, 2018

(87) PCT Pub. No.: WO2017/166349
PCT Pub. Date: Oct. 5, 2017

(65) Prior Publication Data
US 2020/0326253 A1    Oct. 15, 2020

(30) Foreign Application Priority Data

Mar. 31, 2016 (CN) .......................... 201610201532.0
Mar. 31, 2016 (CN) .......................... 201610201765.0
Mar. 31, 2016 (CN) .......................... 201610202573.1

(51) Int. Cl.
*G01L 9/00* (2006.01)
*G05D 16/20* (2006.01)
*H01H 35/24* (2006.01)

(52) U.S. Cl.
CPC ............ *G01L 9/00* (2013.01); *G05D 16/2006* (2013.01); *H01H 35/24* (2013.01)

(58) Field of Classification Search
CPC .. G01L 9/00; G05D 16/2006; G05D 16/2013; H01H 35/24
See application file for complete search history.

(56) References Cited

U.S. PATENT DOCUMENTS

| | | | | |
|---|---|---|---|---|
| 4,836,213 A | * | 6/1989 | Wenzel | A61B 5/021 600/485 |
| 4,854,165 A | | 8/1989 | Jay | |

(Continued)

FOREIGN PATENT DOCUMENTS

| | | |
|---|---|---|
| CN | 201364379 Y | 12/2009 |
| CN | 102890238 A | 1/2013 |

(Continued)

OTHER PUBLICATIONS

Zhang et al., Specific Performance of Verification Regulations in APSL Automatic Pressure Instrument Verification System, China Metrology, Oct. 31, 2008.

(Continued)

*Primary Examiner* — Kyle R Quigley
(74) *Attorney, Agent, or Firm* — Rabin & Berdo, P.C.

(57) ABSTRACT

A method and a device for detecting the switching value of a pressure switch. The device comprises: a pressure generator in communication with a pressure switch by means of pressure piping, a pressure control element, a pressure sensor, and a controller provided with a data processing unit. The pressure sensor is installed on the pressure piping and is electrically connected to the controller. The pressure control element is electrically connected to the pressure generator to control the pressure generator, and is electrically connected to the controller. The pressure sensor transfers the pressure change of the pressure piping to the controller in real time, the data processing unit acquires the value of the pressure change and generates a control instruction according to a preset pressure change rule, and the (Continued)

pressure control element controls the pressure generator to change the pressure within the piping. The device and the method are used to complete the detection of the switching value of a pressure switch, fast detection is achieved, the detection accuracy is improved, the repeatability of the detection result is good, the manual operation cost is reduced and the operation is reliable.

20 Claims, 5 Drawing Sheets

(56) References Cited

U.S. PATENT DOCUMENTS

| | | | |
|---|---|---|---|
| 5,117,675 A | 6/1992 | Notoyama et al. | |
| 5,475,619 A | 12/1995 | Sugano et al. | |
| 2012/0211103 A1* | 8/2012 | Walls | E03B 7/075 |
| | | | 137/565.17 |
| 2013/0041591 A1* | 2/2013 | Lamego | A61B 5/14551 |
| | | | 702/19 |
| 2015/0066430 A1* | 3/2015 | Priori | F02C 9/00 |
| | | | 702/179 |
| 2015/0327060 A1* | 11/2015 | Gilson | H04L 63/08 |
| | | | 726/7 |

FOREIGN PATENT DOCUMENTS

| | | |
|---|---|---|
| CN | 103699147 A | 4/2014 |
| CN | 204374380 U | 6/2015 |
| CN | 205450209 U | 8/2016 |

OTHER PUBLICATIONS

Communication Pursuant to Article 94(3) EPC, dated Jun. 25, 2021, from European Patent Office, in Application No. 16 896 127.4.

* cited by examiner

METHOD AND DEVICE FOR DETECTING SWITCHING VALUE OF PRESSURE SWITCH

FIELD OF THE INVENTION

The present invention belongs to the pressure detection field, and particularly relates to a device for detecting the switching value of a pressure switch and a detection method utilizing the device.

BACKGROUND OF THE INVENTION

Pressure switches are common pressure control devices. A pressure switch switches between an ON state and an OFF state to provide an alarm or control signal when the input pressure reaches (rises or drops to) a preset value. The pressure value at which a pressure switch switches states is referred to the switching value of the pressure switch, including upper switching value and lower switching value. The pressure value of a pressure system can be controlled with a certain range by controlling the start, stop or pressurization of the pressure generator and the opening or closing of the pressure reducing valve in the system. In pressure control processes in industrial domains, the accuracy of the detection of switching values of pressure switches has direct influence on pressure control accuracy. Therefore, pressure switches must be checked and the switching values of the pressure switches must be detected before the pressure switches can be used.

Common pressure switches are generally categorized into mechanical pressure switches and electronic pressure switches. In an electronic pressure switch, a pressure sensing element converts the pressure into an electrical signal, the electrical signal is processed through a signal processing circuit and converted into a digital signal through A/D conversion, and then the digital signal is processed by a processor to obtain a pressure value; meanwhile, the processor compares the pressure value with a value preset by the user to cause a switching element (e.g., mechanical relay or electronic switching element, etc.) to switch on or off. In a mechanical pressure switch, a pressure sensing element (e.g., a diaphragm, a bellows, or a piston, etc.) converts the pressure into a strain, and then a mechanical mechanism uses the strain to drive a switching element to switch on or off. Usually, a pressure switch has a pipeline input interface end and an ON-OFF signal output interface end, wherein the pipeline input interface end may be connected to a hydraulic pipeline or pneumatic pipeline to form a path to an external pressure pipeline, and the ON-OFF signal output interface end generates a digital signal (including ON-OFF signal output type, level output type, and logic signal output type, etc.) to activate a contact of the pressure switch, and is used to connect to a control unit in an industrial control system to carry out pressure control.

In an existing pressure switch detection system (e.g., as shown in FIG. 4), a pressure source 100, a standard pressure gauge 101, and a pressure switch 103 are connected through an equipressure pipeline 102 to form a path, and a switch state acquisition unit 104 is connected to the pressure switch 103 to detect the open/close of the contact of the pressure switch 103. The pressure source 100 pressurizes or depressurizes the pressure switch 103 slowly. In this process, the change of the switch state of the switch is usually detected by listening to the sound and taking the reading manually, or the ON/OFF state of the switch may be detected with a multi-meter. In the detection process, the operator has to take the reading in an accurately and timely manner while evaluating the change of the switch. As a result, some time delay is inevitable in that process. Consequently, a severe error may exist between the reading and the true value, and a mis-reading or mis-evaluation phenomenon may occur easily; the detection result may vary each time and the consistency amount multiple readings may be poor owing to a non-uniform pressurization/depressurization rate incurred by manual reading and operation; moreover, in such a pressure switch detection system, the slow pressurization/depressurization process of the pressure switch 103 driven by the pressure source 100 is time-consuming.

CONTENTS OF THE INVENTION

To solve the above-mentioned problems, in one aspect, the present invention provides a device for detecting the switching value of a pressure switch that achieves high consistency and high accuracy and is convenient to use.

The above object of the present invention is attained with the following technical solution: A device for detecting the switching value of a pressure switch, comprising a pressure generator that communicates with the pressure switch via a pressure pipeline, a pressure control element, a pressure sensor, and a controller with a data processing unit, wherein, the pressure sensor is installed on the pressure pipeline and electrically connected to the controller, the pressure control element is electrically connected to the pressure generator, configured to control the pressure generator, and electrically connected to the controller, the data processing unit of the controller is electrically connected to the pressure sensor and the pressure switch to acquire data, analyze and process the acquired data, generate a corresponding control command, and transmit the control command via the pressure control element to the pressure generator.

In the device for detecting the switching value of a pressure switch described above, the controller further comprises a storage unit, which is electrically connected to and interacts with the pressure control element and the pressure sensor, and has an interface for data interaction with the data processing unit.

The device for detecting the switching value of a pressure switch described above further comprises an electrical interface electrically connected to the controller, wherein, the electrical interface is an integrated component that has different interfaces, including digital signal interface, USB interface, serial interface, wireless interface, and Ethernet interface.

The device for detecting the switching value of a pressure switch described above further comprises an external device connected to the controller, including computer, liquid crystal display (LCD) or touch screen.

In another aspect, the present invention provides a method for detecting the switching value of a pressure switch, which utilizes the above-mentioned device for detecting the switching value of a pressure switch to detect the switching value of a pressure switch, and comprises the following steps:

Initial value acquisition step: acquiring a pressure value of the pressure switch as an initial upper switching value $R_0$ and a corresponding pressurization rate as an initial pressurization rate $v_{10}$ at the time of state switching of the pressure switch in a pressurization process of the pressure switch via the pressure sensor, or acquiring a pressure value of the pressure switch as an initial lower switching value $F_0$ and a corresponding depressurization rate as an initial depressurization rate $v_{20}$ at the time of state switching of the pressure switch in a depressurization process of the pressure switch via the pressure sensor, by the data processing unit of the controller;

Detected value acquisition step: transmitting a command for adjusting (increasing or decreasing) the pressure in the pressure pipeline to the pressure generator via the pressure control element, acquiring a pressure value of the pressure switch as a detected upper switching value R and a corresponding pressurization rate $v_{1i}$ at the time of state switching of the pressure switch in a pressurization process of the pressure switch via the pressure sensor, or acquiring a pressure value as a detected lower switching value $F_i$ and a corresponding depressurization rate $v_{2i}$ at the time of state switching of the pressure switch in a depressurization process of the pressure switch via the pressure sensor, by the data processing unit, where i=1,2,3 . . . ;

Judgment step: comparing a difference between a maximum value and a minimum value between/among the detected upper switching values (including the initial upper switching value) or the detected lower switching values (including the initial lower switching value) that were acquired in the last two or more times with a specified value δ, by the data processing unit, and returning to the detected value acquisition step if the difference is greater than or equal to the specified value δ; or taking the detected upper switching value or detected lower switching value that was acquired in the last time as the upper switching value or lower switching value of the pressure switch and outputting that value, by the data processing unit, if the difference is smaller than the specified value δ.

In the method for detecting the switching value of a pressure switch described above, the controller further comprises a storage unit, which is electrically connected to and interacts with the pressure control element and the pressure sensor, and has an interface for data interaction with the data processing unit.

In the method for detecting the switching value of a pressure switch described above, the detection device further comprises an electrical interface electrically connected to the controller, wherein, the pressure switch transmits a switching action signal of the pressure switch to the controller via the electrical interface.

In the method for detecting the switching value of a pressure switch described above, the detection device further comprises an external device connected to the controller via the electrical interface, wherein, the electrical interface is an integrated component that has different interfaces, including digital signal interface, USB interface, serial interface, wireless interface and Ethernet interface, and the external device may be one or more of computer, liquid crystal display (LCD) and touch screen.

More specifically, the method for detecting the switching value of a pressure switch comprises two schemes:

Scheme I

In the existing pressure switch detection system shown in FIG. 4, the pressure source 100 pressurizes or depressurizes the pressure switch 103 slowly. In that process, the change of the switch is usually detected by listening to the sound and evaluated by taking a reading manually, or the ON/OFF state of the switch may be detected with a multi-meter [VOLT METER?]. In the detection process, the operator has to take the reading in an accurate and timely manner while detecting the change of the switch. As a result, some time delay is inevitable in the process. Consequently, a severe error may exist between the reading and the true value, and a mis-reading or mis-detection phenomenon may occur easily; the detection result may vary from one time to the next and the consistency may be poor owing to a non-uniform pressurization/depressurization rate incurred by manual reading and operation.

In the method for detecting the switching value of a pressure switch as specified in the existing specification, since the pressure change rate at the time the switching value is detected is not specified quantitatively but is only described as "low", it is very difficult to ensure uniformity and accuracy of the detection result; in addition, in the existing method, usually a rough range of switching value must be specified.

In "Embodiment 1" in Scheme I, to solve the above problem, a method for detecting the switching value of a pressure switch is provided which achieves high accuracy and high consistency and is convenient to use. The method comprises the following steps:

Initial value acquisition step: acquiring a pressure value of the pressure switch as an initial upper switching value $R_0$ and a corresponding pressurization rate as an initial pressurization rate $v_{10}$ at the time of state switching of the pressure switch in a pressurization process of the pressure switch, or acquiring a pressure value of the pressure switch as an initial lower switching value $F_0$ and a corresponding depressurization rate as an initial depressurization rate $v_{20}$ at the time of state switching of the pressure switch in a depressurization process of the pressure switch;

Detected value acquisition step: acquiring a pressure value as a detected upper switching value $R_i$ and a corresponding pressurization rate $v_{1i}$ at the time of state switching in a pressurization process of the pressure switch, or acquiring a pressure value as a detected lower switching value $F_i$ and a corresponding depressurization rate $v_{2i}$ at the time of state switching in a depressurization process of the pressure switch, in a way that ensures the pressurization rate or depressurization rate at the time of state switching of the pressure switch is smaller than the pressurization rate $v_{1(i-1)}$ or depressurization rate $v_{2(i-1)}$ in the last time of state switching of the pressure switch, where i=1,2,3 . . . ;

Judgment step: comparing a difference between a maximum value and a minimum value between/among the detected upper switching values (including the initial upper switching value) or the detected lower switching values (including the initial lower switching value) that were acquired in the last two or more times with a specified value δ, and returning to the detected value acquisition step if the difference is greater than or equal to the specified value δ; or taking the detected upper switching value or detected lower switching value that was acquired in the last time as the upper switching value or lower switching value of the pressure switch, if the difference is smaller than the specified value δ.

In the detected value acquisition step in the Scheme I, the pressurization rate or depressurization rate is decreased from the pressurization rate $v_{1(i-1)}$ or depressurization rate $v_{2(i-1)}$ in the last time of state switching of the pressure switch, a rate adjustment value is added to the decreased pressurization rate or depressurization rate, and then the resultant pressurization rate or depressurization rate is used to change the pressure in the pipeline via the pressure control element and the pressure generator; in addition, the rate adjustment value is decreased as the pressure value in the pressure pipeline is closer to the detected upper switching value (including the initial upper switching value) or the detected lower switching value (including the initial lower switching value) that was acquired in the last time; specifically:

In the pressurization process, the rate adjustment value is a function of the pressure value in the pipeline expressed by $\Delta V_{ij} k(R_{i-1}-p_j)$, and the pressurization rate is expressed by $V_{ij}=\theta v_{1(i-1)}+\Delta V_{ij}$, where, $\Delta V_{ij}$ is the rate adjustment value in the detection step j in the detected value acquisition step i, $V_{ij}$ is the pressurization rate in the detected value acquisition step i, $v_{1(i-1)}$ is the pressurization rate when the detected upper switching value was acquired in the detected value acquisition step (i−1) $R_{i-1}$ is the detected upper switching value detected in the detected value acquisition step (i−1), $p_j$ is the pressure value in the pressure pipeline detected in the detection step j, k is a pressure adjustment factor, θ is a rate adjustment factor, and k≥0, 0≤θ<1, i=1,2,3, . . . , j=1,2, 3, . . . ; if k=0, the pressurization rate is expressed by $V_i=\theta v_{1(i-1)}$ (see embodiment 1: constant rate pressure control method).

In the depressurization process, the rate adjustment value is a function of the pressure value in the pipeline expressed by $\Delta V_{ij}=k(p_j-F_{i-1})$ and the depressurization rate is expressed by $V_{ij}=\theta v_{2(i-1)}+\Delta V_{ij}$, where, $\Delta V_{ij}$ is the rate adjustment value in the detection step j in the detected value acquisition step i, $V_{ij}$ is the depressurization rate in the detected value acquisition step i, $v_{2(i-1)}$ is the depressurization rate when the detected lower switching value was acquired in the detected value acquisition step (i−1), $F_{i-1}$ is the detected lower switching value detected in the detected value acquisition step (i−1), $p_j$ is the pressure value in the pressure pipeline detected in the detection step j, k is a pressure adjustment factor, θ is a rate adjustment factor, and k≥0, 0<θ<1, i=1,2, 3, . . . , j=1,2,3, . . . ; if k=0, the depressurization rate is expressed by $V_i=\theta v_{2(i-1)}$ (see embodiment 1: constant rate pressure control method).

The detection method provided in the Embodiment 1 can solve the problem of accuracy and consistency.

In addition, in the prior art pressure switch detection system, as shown in FIG. 3, there is a problem that the pressurization and depressurization process of the pressure switch 103 driven by the pressure source 100 is slow and time-consuming. Embodiment 2 in Scheme I solves this problem by providing a method for detecting the switching value of a pressure switch that can accomplish the pressurization and/or depressurization process quickly.

The difference between the embodiment 2 and the embodiment 1 lies in that the value of k is k>0 (see embodiment 2: variable rate pressure control method). The detection method provided in the embodiment 2 can realize quick detection, besides solving the problem of accuracy and repeatability.

In the Scheme I, the specified value δ in the detected value acquisition step is preset accuracy, and its value is within a range of 0.2-0.5 times of the accuracy of the pressure switch. The rate adjustment factor θ preferably is θ≥0.3 and θ≤; 0.7.

In the method for detecting the switching value of a pressure switch described above, in the initial value acquisition step, the pressure in the pressure pipeline is changed at a high pressurization rate or depressurization rate, till ON-OFF state switching of the pressure switch is detected; at that point, the pressure value at the time of state switching of the pressure switch is acquired as an initial upper switching value $R_i$ or initial lower switching value $F_i$, and the pressurization rate or depressurization rate at the time of state switching of the pressure switch is taken as an initial pressurization rate $v_{1i}$ or initial depressurization rate $v_{2i}$.

A device for detecting the switching value of a pressure switch corresponding to the Scheme I is shown in FIG. 9. The device comprises a pressure generator, a pressure sensor, and a pressure pipeline, wherein the pressure generator and the pressure sensor communicate with the pressure switch through the pressure pipeline, the pressure value in the pressure pipeline is adjusted via the pressure generator, so that the pressure switch is switched between ON state and OFF state; the device further comprises an initial value acquisition unit, a detected value acquisition unit, and a judgment unit, wherein:

The initial value acquisition unit controls the pressure generator to change the pressure in the pressure pipeline, acquires a pressure value as an initial upper switching value $R_0$ and a corresponding pressurization rate as an initial pressurization rate $v_{10}$ at the time of state switching of the pressure switch in a pressurization process of the pressure switch, or acquires a pressure value as an initial lower switching value $F_0$ and a corresponding depressurization rate as an initial depressurization rate $v_{20}$ at the time of state switching of the pressure switch in a depressurization process of the pressure switch;

The detected value acquisition unit controls the pressure generator to change the pressure in the pressure pipeline, acquires a pressure value as a detected upper switching value $R_i$ and a corresponding pressurization rate $v_{1i}$ at the time of state switching of the pressure switch in a pressurization process of the pressure switch or acquires a pressure value as a detected lower switching value $F_i$ and a corresponding depressurization rate $v_{2i}$ at the time of state switching of the pressure switch in a depressurization process of the pressure switch, in a way that ensures the pressurization rate or depressurization rate at the time of state switching of the pressure switch is smaller than the pressurization rate $v_{1(i-1)}$ or depressurization rate $v_{2(i-1)}$ in the last time of state switching of the pressure switch, where i=1,2,3 . . . ;

The judgment unit receives the data values acquired by the detected value acquisition unit, compares the difference between a maximum value and a minimum value between/among detected upper switching values (including the initial upper switching value) or detected lower switching values (including the initial lower switching value) that were acquired in the last two or more times with a specified value δ, and instructs the detected value acquisition unit to perform the next time of acquisition operation if the difference is greater than or equal to the specified value δ; or takes the detected upper switching value or detected lower switching value that was acquired in the last time as the upper switching value or lower switching value of the pressure switch, if the difference is smaller than the specified value δ.

Scheme II

To solve the same problem of accuracy and repeatability of the existing pressure switch detection system as shown in FIG. 4 as the embodiment 1 in the Scheme I, a "embodiment 3" in the Scheme II provides a method for detecting the switching value of a pressure switch, which achieves high accuracy and high repeatability, and is convenient to use. The method comprises the following steps:

Initial value acquisition step: acquiring a pressure value of the pressure switch as an initial upper switching value $R_0$ and a corresponding pressurization rate as an initial pressurization rate $v_{10}$ at the time of state switching of the pressure switch in a pressurization process of the pressure switch, or acquiring a pressure value of the pressure switch as an initial lower switching value $F_0$ and a corresponding depressurization rate as an initial depressurization rate $v_{20}$ at the time of state switching of the pressure switch in a depressurization process of the pressure switch;

Detected value acquisition step: acquiring a pressure value as a detected upper switching value $R_i$ and a corresponding pressurization rate $v_{1i}$ at the time of state switching of the pressure switch in a pressurization process of the pressure switch, or acquiring a pressure value as a detected lower switching value $F_i$ and a corresponding depressurization rate $v_{2i}$ at the time of state switching of the pressure switch in a depressurization process of the pressure switch, where i=1,2,3 . . . ;

Estimated value acquisition step: performing fitting estimation for the detected upper switching values (including the initial upper switching value) or the detected lower switching values (including the initial lower switching value) that were acquired in the last two or more times, and acquires an estimated upper switching value $\hat{R}_r$ or estimated lower switching value $\hat{F}_r$ of the pressure switch, where r=1,2,3 . . . ;

Judgment step: comparing the difference between a maximum value and a minimum value between/among the estimated upper switching values or the estimated lower switching values acquired in the last two or more times with a specified value δ, and returning to the detected value acquisition step if the difference is greater than or equal to the specified value δ; or taking the estimated upper switching value or the estimated lower switching value acquired in the last time as an upper switching value or lower switching value of the pressure switch, if the difference is smaller than the specified value δ.

In the detected value acquisition step in the Scheme II, the pressurization rate or depressurization rate is decreased from the pressurization rate $v_{1(i-1)}$ or the depressurization rate $v_{2(i-1)}$ in the last time of state switching of the pressure switch, a rate adjustment value is added to the decreased pressurization rate or depressurization rate, and the resultant pressurization rate or depressurization rate is used to change the pressure in the pipeline via the pressure control element and the pressure generator; in addition, the rate adjustment value is decreased as the pressure value in the pressure pipeline is closer to the detected upper switching value (including the initial upper switching value) or the detected lower switching value (including the initial lower switching value) that was acquired in the last time; specifically:

In the pressurization process, the rate adjustment value is a function of the pressure value in the pipeline expressed by $\Delta V_{ij}=k(R_{i-1}-p_j)$, and the pressurization rate is expressed by $V_{ij}=\theta v_{1(i-1)}+\Delta V_{ij}$, where, $\Delta V_{ij}$ is the rate adjustment value in the detection step j in the detected value acquisition step i, $V_{ij}$ is the pressurization rate in the detected value acquisition step i, $v_{1(i-1)}$ is the pressurization rate when the detected upper switching value was acquired in the detected value acquisition step (i−1), $R_{i-1}$ is the detected upper switching value detected in the detected value acquisition step (i−1), $p_j$ is the pressure value in the pressure pipeline detected in the detection step i, k is a pressure adjustment factor, θ is a rate adjustment factor, and k≥0, 0<θ<1 i=1,2,3, . . . j=1,2, 3, . . . ; if k=0, the pressurization rate is expressed by $V_i=\theta v_{1(i-1)}$ (see embodiment 3: constant rate pressure control method based on polynomial fitting).

In the depressurization process, the rate adjustment value is a function of the pressure value in the pipeline expressed by $\Delta V_{ij}=k(p_j-F_{i-1})$, and the depressurization rate is expressed by $V_{ij}=\theta v_{2(i-1)}+\Delta V_{ij}$, where, $\Delta V_{ij}$ is the rate adjustment value in the detection step j in the detected value acquisition step i, $V_{ij}$ is the depressurization rate in the detected value acquisition step i, $v_{2(i-1)}$ is the depressurization rate when the detected lower switching value was acquired in the detected value acquisition step (i−1), $F_{i-1}$ is the detected lower switching value detected in the detected value acquisition step (i−1), $p_j$ is the pressure value in the pressure pipeline detected in the detection step j, k is a pressure adjustment factor, θ is a rate adjustment factor, and k≥0, 0<θ<1, =1,2,3, . . . j=1,2,3, . . . ; if k=0, the depressurization rate is expressed by $V_i=\theta v_{2(i-1)}$ (see embodiment 3: constant rate pressure control method based on polynomial fitting).

The detection method provided in the embodiment 3 can solve the problem of accuracy and repeatability.

To solve the same time-consuming problem in the pressure switch detection system as shown in FIG. 4 as the embodiment 2 in the Scheme I, an "embodiment 4" in the Scheme II provides a method for detecting the switching value of a pressure switch, which can accomplish the pressurization and/or depressurization process quickly.

The difference between the embodiment 4 and the embodiment 3 lies in that the value of k is k>0 (see embodiment 4: variable rate pressure control method based on polynomial fitting). The detection method provided in the embodiment 4 can realize quick detection, besides solving the problem of accuracy and repeatability.

In the Scheme II, in the estimated value acquisition step, fitting estimation is performed for the relation between detected upper switching value and pressurization rate or between detected lower switching value and depressurization rate with a polynomial fitting method based on least square, and a corresponding estimated switching value when the pressurization rate or depressurization rate is zero is taken as an estimated upper switching value or estimated lower switching value.

In the judgment step, the specified value δ is preset accuracy, and its value is within a range of 0.2-0.5 times of the accuracy of the pressure switch.

In the initial value acquisition step, the pressure in the pressure pipeline is changed at a high pressurization rate or depressurization rate, till ON-OFF state switching of the pressure switch is detected; at that point, the pressure value at the time of state switching of the pressure switch is acquired as an initial upper switching value $R_i$ or initial lower switching value $F_i$ and the pressurization rate or depressurization rate at the time of state switching of the pressure switch is taken as an initial pressurization rate $v_{1i}$ or initial depressurization rate $v_{2i}$.

A device for detecting the switching value of a pressure switch corresponding to the Scheme II is shown in FIG. 10. The device comprises a pressure generator, a pressure sensor, and a pressure pipeline, wherein, the pressure generator and the pressure sensor communicate with the pressure switch through the pressure pipeline, the pressure value in the pressure pipeline is adjusted via the pressure generator, so that the pressure switch is switched between ON state and OFF state; wherein, the device further comprises an initial value acquisition unit, a detected value acquisition unit, an estimated value acquiring unit, and a judgment unit, wherein:

The initial value acquisition unit controls the pressure generator to change the pressure in the pressure pipeline, acquires a pressure value as an initial upper switching value $R_0$ and a corresponding pressurization rate as an initial pressurization rate $v_{10}$ at the time of state switching of the pressure switch in a pressurization process of the pressure switch, or acquires a pressure value as an initial lower switching value $F_0$ and a corresponding depressurization rate as an initial depressurization rate $v_{20}$ at the time of state switching of the pressure switch in a depressurization process of the pressure switch;

The detected value acquisition unit controls the pressure generator to change the pressure in the pressure pipeline, acquires a pressure value as a detected upper switching value $R_i$ and a corresponding pressurization rate $v_{1i}$ at the time of state switching of the pressure switch in a pressurization process of the pressure switch, or acquires a pressure value as a detected lower switching value $F_i$ and a corresponding depressurization rate $v_{2i}$ at the time of state switching of the pressure switch in a depressurization process, where i=1,2,3 . . . ;

The estimated value acquiring unit receives the data values acquired by the detected value acquisition unit, performs fitting estimation for the detected upper switching values (including the initial upper switching value) or the detected lower switching values (including the initial lower switching value) that were acquired in the last two or more times, and acquires an estimated upper switching value $\hat{R}_r$ or estimated lower switching value $\hat{F}_r$ of the pressure switch, where r=1,2,3 . . . ;

The judgment unit receives the data values acquired by the estimated value acquisition unit, compares the difference between a maximum value and a minimum value between/among estimated upper switching values or the estimated lower switching values that were acquired in the last two or more times with a specified value δ, and instructs the detected value acquisition unit to perform the next time of acquisition operation if the difference is greater than or equal to the specified value δ; or takes the estimated upper switching value or the estimated lower switching value acquired in the last time as an upper switching value or lower switching value of the pressure switch, if the difference is smaller than the specified value δ.

With the technical scheme described above, the present invention attains the following technical effects: In the present invention, the pressure change in a pressure pipeline is transmitted via the pressure sensor to the controller, the data processing unit installed in the controller acquires the pressure change, generates a control command under preset pressure change rules, and controls the pressure generator via the pressure control element to change the pressure in the pipeline; the detection of the switching value of the pressure switch is accomplished with a cyclic detection approach. The device provided in the present invention can accomplish the detection of the switching value of a pressure switch, intelligently and quickly, with improved accuracy and consistency, with reduced labor cost, simplified the operation and reliability.

1—pressure generator; 2—pressure control element; 3—pressure pipeline; 4—pressure sensor; 5—controller; 51—storage unit; 52—data processing unit; 6—electrical interface; 7—pipeline interface; 8—pressure switch;

100—pressure source; 101—standard pressure gauge; 102—equipressure pipeline; 103—pressure switch; 104—switch state acquisition unit

DETAILED DESCRIPTION OF THE EMBODIMENTS

Hereunder the method and device for detecting the switching value of a pressure switch provided in the present invention will be described in specific embodiments, with reference to the accompanying drawings.

The present invention is applicable to detection of the switching value of various pressure switches. Though the present invention is described in the embodiments with reference to an electronic pressure switch, the present invention is not limited to those specific exemplary embodiments; rather, the present invention is intended to encompass all equivalent and alternative forms within the range of the present invention. All other embodiments obtained by those having ordinary skills in the art on the basis of the embodiments described in the present invention without expending any creative labor shall be deemed as falling in the scope of disclosure in the present invention.

Figure 1:
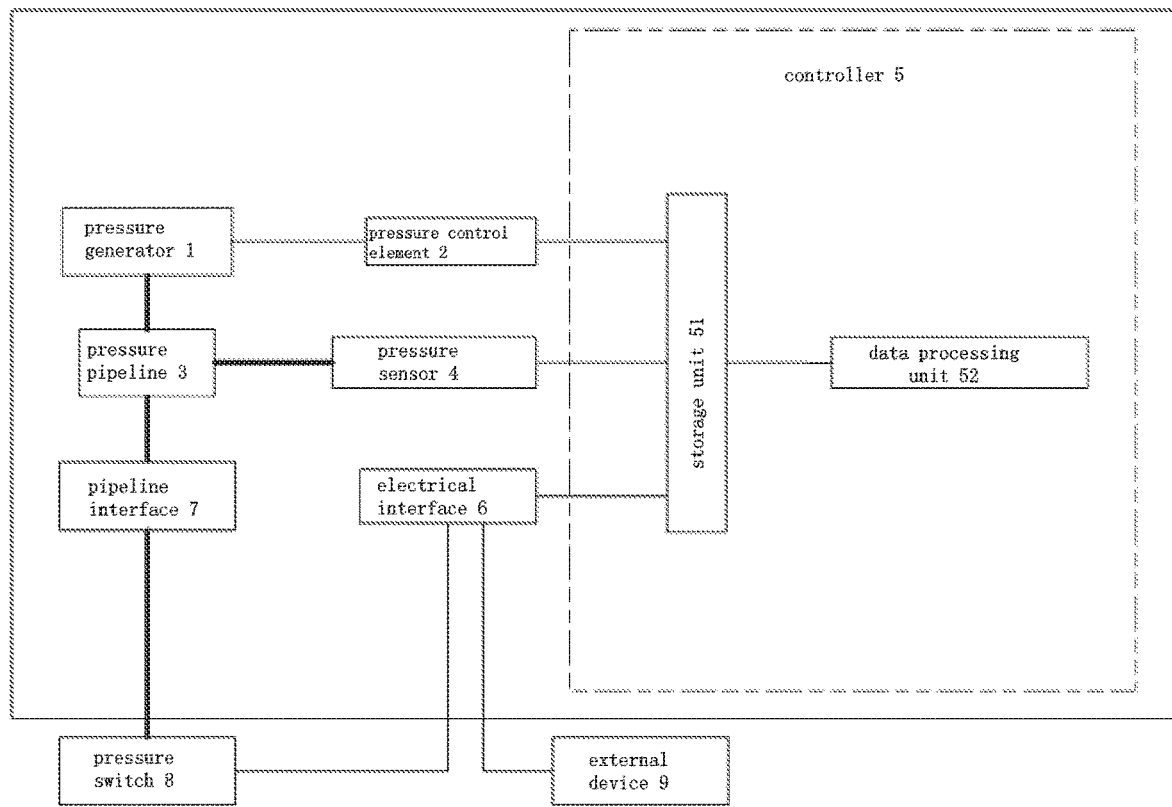
FIG. 1 is a block diagram of the structure of the device for detecting the switching value of a pressure switch provided in an embodiment of the present invention.

FIG. 1 is a block diagram of the structure of the device for detecting the switching value of a pressure switch provided in an embodiment of the present invention. As shown in FIG. 1, the device comprises a pressure generator 1, a pressure control element 2, a pressure pipeline 3, a pressure sensor 4, and a controller 5, wherein, the pressure generator 1 and the pressure sensor 4 are connected through the pressure pipeline 3 to form a physical path (as indicated by the bold line in FIG. 1), and an external pressure switch 8 that communicates physically with the path via a pipeline interface 7; the pressure control element 2 is connected to the pressure generator 1 and is configured to control the pressure generator 1, pressure control element 2 is connected to the controller 5 to store pressure control data in the controller 5, receives control commands from the controller 5 and transmits the control commands to the pressure generator 1; the controller 5 is electrically connected to the pressure sensor 4 and logically connected to the external pressure switch 8 via the electrical interface 6 (including electrical connection or wireless connection, etc.) to receive signals from the pressure sensor 4 and the pressure switch 8, analyze and process the received data, and transmit generated control commands to the pressure generator 1 via the pressure control element 2; the pressure pipeline 3 is connected to a pipeline input interface end of the pressure switch 8 via the pipeline interface 7 and transmits the pressure generated by the pressure generator 1 to the pressure switch 8; additionally, the controller 5 is logically connected to an ON-OFF signal output end of the pressure switch 8 to receive contact action signals from the pressure switch 8.

Wherein the pressure generator 1 may be a pneumatic pressure generator or hydraulic pressure generator, and is driven by a pressure pump; the pressure generator 1 receives control commands from the controller 5 via the pressure control element 2 to control the pressure pump to pressurize or depressurize at different rates; in addition, the pressure control element 2 can transmit the state of the pressure generator 1 to the controller 5 and to an external device 9 (e.g., a computer, an LCD, or a touch screen) for display.

The pressure control element 2 may be a separate element disposed between the pressure generator 1 and the controller 5, serving as an intermediary for signal transmission and conversion; for example, the pressure control element 2 may be an existing integrated control element; alternatively, it may be integrated in the controller 5 or the pressure generator 1 to control the pressure pump to pressurize or depressurize at different rates. The pressure control element 2 can accept control commands from the controller 5 and transmit the state of the pressure generator 1 to the controller 5 and then transmit the state of the pressure generator 1 via the controller 5 to the external device 9.

The pressure sensor 4 is installed on the pressure pipeline 3 and configured to detect the pressure in the pressure pipeline 3 and convert the pressure signal to an electrical signal and transmit the electrical signal to the controller 5.

The electrical interface 6 is an integrated component that has one or more electrical signal interfaces, and can support input and output of different electrical signals, wherein, the electrical interface may include a digital signal interface, a USB interface, a serial interface, and an Ethernet interface, etc. The electrical interface 6 can be electrically connected to the ON-OFF signal output end of the pressure switch 8 to receive electrical signals of contact actions of the pressure switch 8 and transmit the electrical signals to the controller 5, or can be electrically connected to the external device 9 (e.g., a computer, an LCD, or a touch screen, etc.), so that the controller 5 and the external device 9 can perform data interaction with each other via the electrical interface for data acquisition, result display, program downloading, parameter setting, remote debugging, and system updating, etc. Therefore, the device in the present invention may be equipped with a display screen via the electrical interface 6 and configured into a handheld device that can be used in the field conveniently; alternatively, the device may be used as a stationary device and connected to a computer system for remote monitoring.

The pipeline interface 7 may be a fixed interface arranged on the pressure pipeline 3 or a removable and replaceable interface that can be replaced according to the shape of the pipeline input interface end of the pressure switch 8.

The controller 5 may comprise a storage unit 51 and a data processing unit 52, wherein, the storage unit 51 is electrically connected to the pressure control element 2 and the pressure sensor 4, and electrically connected to the pressure switch 8 via the electrical interface 6 to receive, transmit and store data, and has an interface for data interaction with the data processing unit 52; the data processing unit 52 receives data from the storage unit 51, analyzes and process the data, and transmits generated control commands to the pressure control element 2 via the storage unit 51.

The data processing unit 52 of the controller 5 sends control commands to the pressure generator 1 via the storage unit 51 to cause the pressure generator 1 to change the pressure in the pressure pipeline 3 and receives a pressure value acquired by the pressure sensor 4 and state information of the pressure switch 8 so as to accomplish data processing in the detection of the switching value of the pressure switch.

Most existing detection methods for detecting the switching value of a pressure switch are implemented on the basis of the following mechanism: The pressure value that triggers a state change of the switch in a pressurization process is referred to as an upper switching value $R_0$ (true value), the pressure value that triggers a state change of the switch in a depressurization process is referred to as a lower switching value F (true value), and R>F; then, R−F is referred to as a return difference. Owing to the existence of the return difference, the operating stability of the pressure switch is improved. The magnitude of the return difference may vary, depending on the specific requirement in the application scenario. In the measurement process, the pressure value measured by the pressure sensor 4 is an detected upper switching value or detected lower switching value, denoted as $R_i$ or $F_i$ and the measurement error $\varepsilon_i$ is the value obtained by subtracting the true value from the detected switching value in the time i, i.e., $\varepsilon_{1i}=R_i-R$, $\varepsilon_{2i}=F_i-F$, where, i is the sequence number of measurement, R is the true upper switching value, $R_i$ is the upper switching value detected in the time i, and $\varepsilon_{1i}$ is the detection error of the upper switching value in the time i; F is the true lower switching value, $F_i$ is the lower switching value detected in the time i, and $\varepsilon_{2i}$ is the detection error of the lower switching value in the time i.

When the pressure in the pressure pipeline 3 reaches a switching point, a contact actuating signal has to be acquired through several links, including pressure measurement and comparison of the pressure switch, switch driving, switch measurement and time for response to switching capturing, and time for reading pressure sensor, etc. Owing to those factors, the detected switching value may be greater than or smaller than the true switching value.

Therefore, in the measuring process, the time delay mainly consists of two parts: one part is the delay time $t_1$ from the time the pressure value reaches the switching point to the time a switching value of contact action is outputted, and the other part is the delay time $t_2$ from the time the switching value is received to the time the reading of the pressure sensor is received. Owing to the joint influence in the two aspects, $\varepsilon_{1i}=\varepsilon_{11}+\varepsilon_{12}$, and $\varepsilon_{2i}=\varepsilon_{21}+\varepsilon_{22}$, where, $\varepsilon_{1i}$ is the detection error of upper switching value, $\varepsilon_{11}$ is the error incurred by the delay time $t_1$, and $\varepsilon_{12}$ is the error incurred by the delay time $t_2$; $\varepsilon_{2i}$ is the detection error of lower switching value, $\varepsilon_{21}$ is the error incurred by the delay time $t_1$, and $\varepsilon_{22}$ is the error incurred by the delay time $t_2$. Usually, $t_1$ and $t_2$ are relatively small, and the average pressure change rate $\bar{v}$ in the time period may be regarded as a fixed value, i.e., $\varepsilon_{1i}=\varepsilon_{11}+\varepsilon_{12}=\bar{v}(t_1+t_2)$, and $\varepsilon_{2i}=\varepsilon_{21}+\varepsilon_{22}=\bar{v}(t_1+t_2)$; in several detection processes, the delays of the pressure sensor and the pressure switch remain unchanged essentially; therefore, the detection error $\varepsilon_{1i}$ of upper switching value or the detection error $\varepsilon_{2i}$ of lower switching value is essentially proportional to the pressure change rate at the time the pressure switch is triggered to act.

If the amplitude of pressure change is $\Delta p$, the measurement time is t, the pressure change rate is v constantly, then $t=\Delta p/v$ if the measurement time t is enough, i.e., the measurement time t is approximately inversely proportional to the pressure change rate v.

On that basis, on one hand, to detect an accurate switching value of the pressure switch, it is desirable that the pressure change rate v is close to zero at the time of ON-OFF state switching of the pressure switch; on the other hand, to save measurement time, it is desirable that the pressure scanning can be executed at a high pressure change rate v. In actual practice, the detection result of the switching point of the pressure switch may be inaccurate because the pressure change rate is too high; the repeatability is poor because the pressure change rates in the detection processes are inconsistent.

It can be seen from the above analysis: the lower the rate of pressure change at the time of state switching of the pressure switch 8, the higher the detection accuracy of the switching value of the pressure switch. Therefore, when the switching value of the pressure switch is detected with the method provided in the present invention, in which the pressure change rate gradually approaches zero, the detected value will approach the true value; in addition, utilizing the specified value δ for preset accuracy as a evaluation criterion for terminating the detection loop, the above-mentioned object can be attained.

Hereunder the method for detecting the switching value of a pressure switch with the device provided in the present invention will be further detailed. Two implementation schemes are put forward in the present invention.

Scheme I

Figure 2:
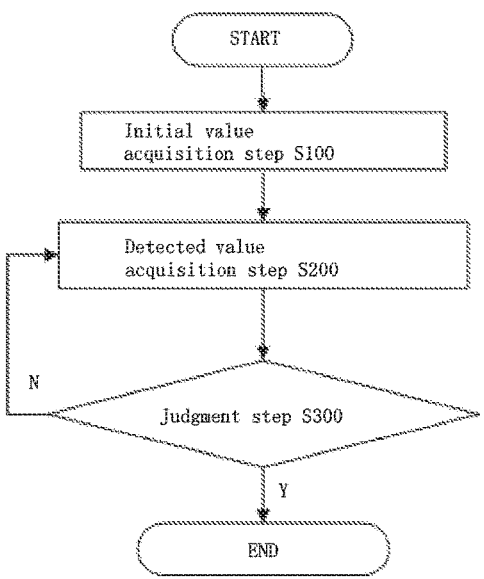
FIG. 2 is a flow chart of the method for detecting the switching value of a pressure switch in the Scheme I in the present invention.
Figure 9:
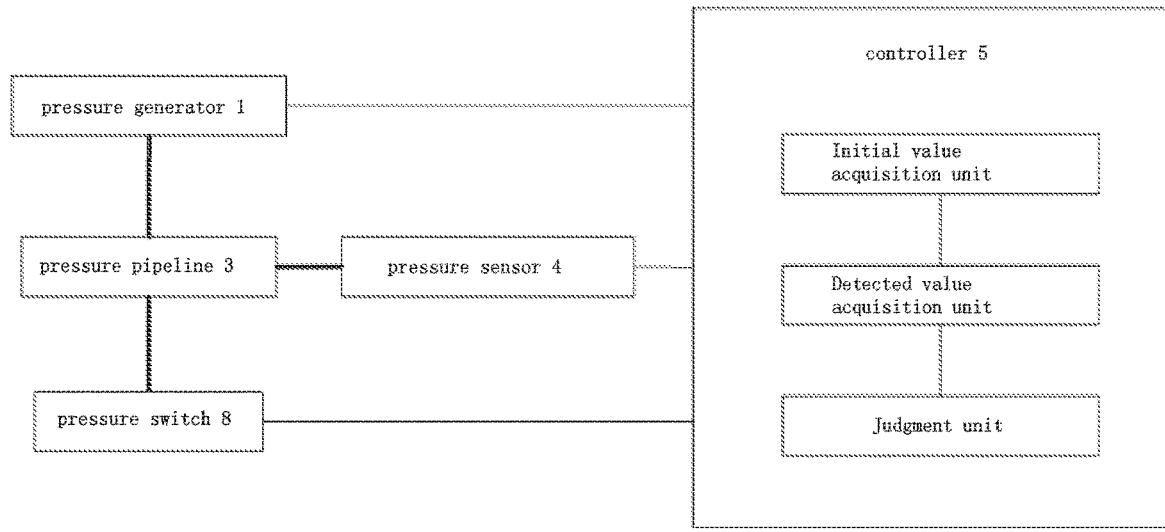
FIG. 9 is a block diagram of the structure of the device for detecting the switching value of a pressure switch corresponding to the Scheme I in the present invention.

FIG. 2 is a flow chart of the method for detecting the switching value of a pressure switch in the Scheme I. The method can be implemented with the device for detecting the switching value of a pressure switch shown in FIG. 1 or 9. The method for detecting the switching value of a pressure switch comprises the following steps:

S100. Initial value acquisition step: acquiring a pressure value as an initial upper switching value $R_0$ and a corresponding pressurization rate as an initial pressurization rate $v_{10}$ at the time of state switching of the pressure switch 8 in a pressurization process of the pressure switch 8, or acquiring a pressure value as an initial lower switching value $F_0$ and a corresponding depressurization rate as an initial depressurization rate $v_{20}$ at the time of state switching of the pressure switch 8 in a depressurization process of the pressure switch 8.

In that step, the pressure in the pressure pipeline 3 is changed at a high pressurization rate or depressurization rate, till ON-OFF state switching of the pressure switch 8 is detected; at that point, the pressure value at the time of state switching of the pressure switch 8 is acquired with the pressure sensor and taken as an initial upper switching value $R_0$ or initial lower switching value $F_0$ and the pressurization rate or depressurization rate at the time of state switching of the pressure switch 8 is taken as an initial pressurization rate $v_{10}$ or initial depressurization rate $v_{20}$.

Here, in the initial value acquisition process, the initial pressurization rate or initial depressurization rate is usually determined from an empirical value according to the performance of the pressure switch 8; usually, the initial pressurization rate or initial depressurization rate is selected near the upper limit of the empirical value of pressurization rate or empirical value of depressurization rate, so as to approximate to the switching value of the pressure switch 8 as soon as possible and thereby reduce the detection time.

The pressurization rate or depressurization rate at the time of state switching of the pressure switch can be obtained by computing with a program; namely, the process from the time the pressure sensor 4 reads the pressure value in the pressure pipeline 3 to the next time the pressure sensor 4 reads the pressure value in the pressure pipeline 3 is used as a detection step, and the pressurization rate $v_{10}$ or depressurization rate $v_{20}$ at the time of state switching of the pressure switch is determined by subtracting the pressure value detected in the previous detection step from the pressure value detected at the time of state switching of the pressure switch and then dividing the result by the time used in the detection step; alternatively, if the pressure sensor 4 has a rate measurement function, the pressurization rate $v_{10}$ or depressurization rate $v_{20}$ at the time of state switching of the pressure switch may be recorded by the pressure sensor 4; or the pressurization rate or depressurization rate at the time of state switching of the pressure switch 8 may be set on the basis of an empirical value.

S200. Detected value acquisition step: acquiring a pressure value as a detected upper switching value $v_{1(i-1)}$ and a corresponding pressurization rate $v_{2(i-1)}$ at the time of state switching in a pressurization process of the pressure switch, or acquiring a pressure value as a detected lower switching value $R_i$ and a corresponding depressurization rate $v_{1i}$ at the time of state switching in a depressurization process of the pressure switch, in a way that ensures the pressurization rate or depressurization rate at the time of state switching of the pressure switch is smaller than the pressurization rate $F_i$ or depressurization rate $v_{2i}$ in the last time of state switching of the pressure switch, where i=1,2,3 . . . ;

In the above detected value acquisition step, in the process from the time the pressure value is detected initially to the time of state switching of the pressure switch 8, the pressurization rate or depressurization rate may be any value within a reasonable range for the pressure switch; preferably, the pressure in the pressure pipeline 3 is changed at a high pressurization rate or depressurization rate, which may be an approximately constant pressurization rate or depressurization rate or a varying pressurization rate or depressurization rate; for example, the pressurization rate or depressurization rate in the detected value acquisition step may be a function of the detected pressure value in the pressure pipeline 3; at the time of state switching of the pressure switch 8, a criterion that the pressurization rate or depressurization rate is smaller than the pressurization rate $v_{1(i-1)}$ or depressurization rate $v_{2(i-1)}$ in the last time of state switching of the pressure switch 8 is met.

S300. Judgment step: comparing a difference between a maximum value and a minimum value between/among the detected upper switching values (including the initial upper switching value) or the detected lower switching values (including the initial lower switching value) that were acquired in the last two or more times with a specified value δ, and returning to the detected value acquisition step if the difference is greater than or equal to the specified value δ; or taking the detected upper switching value or detected lower switching value that was acquired in the last time as the upper switching value or lower switching value of the pressure switch, if the difference is smaller than the specified value δ.

In the judgment step of the method, the difference between detected switching values acquired in the last two times may be compared with the specified value δ to judge whether the method should be terminated, or the difference between a maximum value and a minimum value among the detected switching values acquired in the last three or more times may be compared with the specified value δ to judge whether the method should be terminated, wherein, the specified value δ may be set according to the accuracy of the pressure switch 8 and the requirement for accuracy in the application scenario, and the specified value δ may be a fixed value or a non-fixed value; for example, the specified values δ used in the judgment steps in two detection processes may be different from each other; the switching value of the pressure switch obtained with the latter method has higher reliability, and accordingly the detection time may be longer. A trade-off may be made according to the detection requirement.

Optionally, the method may further comprise an initialization step before the step S100 to set the parameters involved in the method; for example, the specified value δ may be set; other parameters to be set may be determined according to the specific embodiment; that step may be neglected if the parameter values are fixed to default values.

Optionally, the method may further comprise an output step after the judgment step S300, i.e., recording the detected upper switching value and detected lower switching value obtained in the last cycle as upper switching value and lower switching value of the pressure switch 8 in the controller 5, and transmitting the result to the external device 9.

Different variants of the implementation process of the above-mentioned steps may be possible, according to different embodiments.

The method may be used to detect the upper switching value or lower switching value of a pressure switch separately, and may also be used to detect the upper switching value and lower switching value of a pressure switch at the same time.

Hereunder two different embodiments (embodiment 1 and embodiment 2) will be introduced in detail, in an example in which the upper switching value and lower switching value of a pressure switch are detected at the same time and the difference between a maximum value and a minimum value between the detected switching values acquired in the last two times is compared with the specified value δ.

Embodiment 1: Constant Rate Pressure Control Method

Please see the flow chart in FIG. 2. In the embodiment 1, the switching value of a pressure switch is detected through the following process:

Initial value acquisition step: the pressure generator 1 changes the pressure in the pressure pipeline 3 at a high pressurization rate or depressurization rate, till ON-OFF state switching of the pressure switch 8 is detected; at that point, the pressure sensor 4 acquires the pressure value in the pressure pipeline 3 as an initial upper switching value $R_0$ or initial lower switching value $F_0$ and the corresponding initial pressurization rate $v_{10}$ or initial depressurization rate $v_{20}$ at the time of state switching of the pressure switch 8, and the acquired values are stored in the controller 5.

Detected value acquisition step: the pressure generator 1 increases the pressure in the pressure pipeline 3 from the lower switching value $F_{(i-1)}$ at a pressurization rate $V_i = \theta V_{1(i-1)}$, the upper switching value acquired by the pressure sensor 4 at the time of state switching of the pressure switch 8 is taken as a detected upper switching value $R_i$, and the pressurization rate $v_{1i}$ at the time of state switching of the pressure switch 8 is acquired; the pressure generator 1 decreases the pressure in the pressure pipeline 3 from the upper switching value $R_i$ at a depressurization rate $V_i = \theta V_{2(i-1)}$, the lower switching value acquired by the pressure sensor 4 at the time of state switching of the pressure switch 8 is taken as a detected lower switching value $F_i$, the pressurization rate $v_{2i}$ at the time of state switching of the pressure switch 8 is acquired, and the acquired values are stored in the controller 5, where, i is the cycle index, θ is the rate adjustment factor, and i=1,2,3 . . . , 0<θ<1.

Judgment step: If r≥1 and the following criterion is met: $\max(R_{i-1}, R_i) - \min(R_{i-1}, R_i) < \delta$ and $\max(F_{i-1}, F_i) - \min(F_{i-1}, F_i) < \delta$, then the detection is terminated, the detected upper switching value and detected lower switching value obtained in the last cycle are taken as upper switching value and lower switching value of the pressure switch 8 and stored in the controller 5, and the loop is exited; otherwise the cycle index i is incremented by 1, and the process turns to the detected value acquisition step, wherein, the specified value δ is preset accuracy, and its value is 0.2-0.5 times of the accuracy of the pressure switch 8.

In the above process, if the parameters (e.g., specified value δ and the rate adjustment factor θ) are to be set again, the embodiment may further comprise an initialization step; if the device is connected to an external device 9, the embodiment 1 may further comprise an output step.

In the above process, the number of cycles depends on the preset specified value δ, rate adjustment factor θ, and initial pressurization rate $v_{10}$ and/or initial depressurization rate $v_{20}$, etc.; in the detected value acquisition step of the method, the higher the rate adjustment factor θ is, the less the pressurization rate or depressurization rate is decreased in each time of detection, and thereby the shorter the required time is; however, in such a case, usually the times of detection required to reach required accuracy will be increased, and the total detection time will be longer accordingly; in contrast, the lower the rate adjustment factor θ is, the more the pressurization rate or depressurization rate is decreased in each time of detection; accordingly, usually the times of detection will be reduced, but the execution time in each time of detection will be longer. In addition, if the change of pressurization rate or depressurization rate in each time of detection from the pressurization rate or depressurization rate in the last time of state switching of the pressure switch is very small, the change of the obtained detected upper switching value or detected lower switching value of the pressure switch will be very small; especially, in a case that the pressurization rate or depressurization rate is great in itself, the difference between the obtained upper switching value or lower switching value of the pressure switch and the true value may be great, though the difference between the detected upper switching values or detected lower switching values obtained in two times meets the judgment criterion in the judgment step. Through arduous study, the inventor has found: for the constant rate pressure control method, the above defect can be eliminated by controlling the range of the rate adjustment factor θ to be 0.3≤θ≤0 0.7. Usually the specified value δ is set with reference to the nominal value of the pressure switch and the requirement for accuracy in the application scenario, and the value range may be 0.2-0.5 times of the accuracy of the pressure switch 8; the value range of the specified value δ being 0.2-0.5 times of the accuracy of the pressure switch 8 means that the specified value δ may be a fixed value or non-fixed value within a range of 0.2-0.5 times of the accuracy of the pressure switch 8; for example, the specified values δ used in the judgment steps in two detection processes may be different from each other.

Embodiment 2: Variable Rate Pressure Control Method

In order to further reduce the detection time while meeting the specified value δ that is used as preset accuracy, the above-mentioned embodiment 1 of the method is improved by using real-time varying pressurization rate and depressurization rate in each time of detection, i.e., the pressure change rate is higher when the pressure is farther from the state switching point of the pressure switch, so as to save time; the pressure change rate is lower when the pressure is closer to the state switching point of the pressure switch, to reduce the detection error. In the detection process, the process from the time the pressure sensor 4 reads the pressure value in the pressure pipeline 3 to the next time the pressure sensor 4 reads the pressure value in the pressure pipeline 3 is used as a detection step; the process through which the detection of an upper switching value and an lower switching value of the pressure switch is accomplished is used as a cycle.

The steps included in the variable rate pressure control method in the embodiment 2 are essentially the same as the steps in the embodiment 1, except the rules under which the pressure generator 1 changes the pressure in the pressure pipeline 3 in the detected value acquisition step. The detected value acquisition step in the embodiment 2 is as follows:

Detected value acquisition step: the pressure generator 1 increases the pressure in the pressure pipeline 3 from the lower switching value $F_{i-1}$ at a pressurization rate $V_{ij}=\theta v_{1(i-1)}+k(R_{i-1}-p_j)$, the upper switching value acquired by the pressure sensor 4 at the time of state switching of the pressure switch 8 is taken as a detected upper switching value $R_i$, and the pressurization rate $v_{1i}$ at the time of state switching of the pressure switch 8 is acquired, where, i is the cycle index, i=1,2,3, . . . , j is the detection step index, j=1,2,3, . . . , k is the pressure adjustment factor, θ is the rate adjustment factor, 0<k, and 0<θ<1; $p_j$ is the pressure value detected by the pressure sensor unit 3 in the detection step j; $v_{1(i-1)}$ is the pressurization rate or initial pressurization rate at the time the detected upper switching value is acquired in the detected value acquisition step (i−1), and $R_{i-1}$ is the detected upper switching value or initial upper switching value detected in the detected value acquisition step i−1;

the pressure generator 1 decreases the pressure in the pressure pipeline 3 from the detected upper switching value $R_i$ at a depressurization rate $V_{ij}=\theta v_{2(i-1)}+k(p_j-F_{i-1})$ the lower switching value acquired by the pressure sensor 4 at the time of state switching of the pressure switch 8 is taken as a detected lower switching value $F_i$, and the pressurization rate $v_{2i}$ at the state switching of the pressure switch 8 is acquired; and the acquired values are stored in the controller 5; where, $p_j$ is the pressure value detected by the pressure sensor unit 3 in the detection step j; $v_{2(i-1)}$ is the depressurization rate or initial depressurization rate at the time of state switching of the pressure switch 8 in the detected value acquisition step (i−1), and $F_{i-1}$ is the detected lower switching value or initial lower switching value detected in the detected value acquisition step i−1.

Likewise, this embodiment may further comprise an initialization step and/or an output step.

The pressure in the pressure pipeline 3 is changed at a real-time varying pressurization rate or depressurization rate, the detected upper switching value or detected lower switching value of the pressure switch is detected, and the pressure adjustment factor k is a fixed value greater than zero. Likewise, the defect related with the range of the rate adjustment factor θ as described in the embodiment 1 must be eliminated too. For the variable rate pressure control method, the range of the rate adjustment factor θ is controlled to be 0.3≤θ≤0.7. Usually the specified value δ is set with reference to the nominal value of the pressure switch and the requirement for accuracy in the application scenario, and the value range may be 0.2-0.5 times of the accuracy of the pressure switch 8; the value range of the specified value δ being 0.2-0.5 times of the accuracy of the pressure switch 8 means that the specified value δ may be a fixed value or non-fixed value within a range of 0.2-0.5 times of the accuracy of the pressure switch 8; for example, the specified values δ used in the judgment steps in two detection processes may be different from each other.

The method can further reduce the detection time so that the detected upper switching value or detected lower switching value approaches the true value quickly and achieves high consistency.

Scheme II

Figure 3:
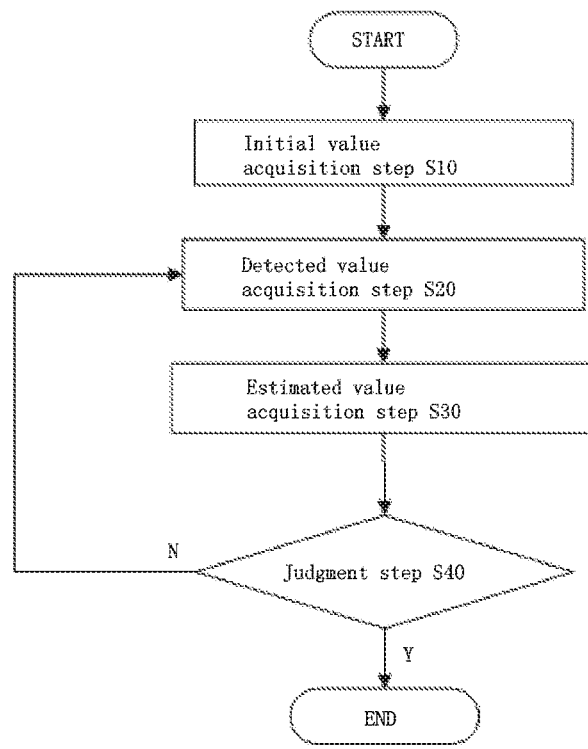
FIG. 3 is a flow chart of the method for detecting the switching value of a pressure switch in Scheme II in the present invention.
Figure 4:
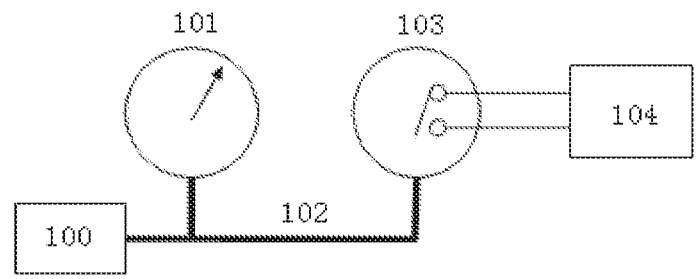
FIG. 4 is a schematic diagram of an existing pressure switch detection system.

FIG. 3 is a flow chart of the method for detecting the switching value of a pressure switch in the Scheme II. The method can be implemented with the device for detecting the switching value of a pressure switch shown in FIG. 1 or 10. The method for detecting the switching value of a pressure switch comprises the following steps:

S10. Initial value acquisition step: acquiring a pressure value as an initial upper switching value $R_0$ and a corresponding pressurization rate as an initial pressurization rate $v_{10}$ at the time of state switching of the pressure switch 8 in a pressurization process of the pressure switch 8, or acquiring a pressure value as an initial lower switching value $F_0$ and a corresponding depressurization rate as an initial depressurization rate $v_{20}$ at the time of state switching of the pressure switch 8 in a depressurization process of the pressure switch 8.

In that step, the pressure in the pressure pipeline 3 is changed at a high pressurization rate or depressurization rate, till ON-OFF state switching of the pressure switch 8 is detected; at that point, the pressure value at the time of state switching of the pressure switch 8 is acquired with the pressure sensor and taken as an initial upper switching value $R_0$ or initial lower switching value $F_0$, and the pressurization rate or depressurization rate at the time of state switching of the pressure switch 8 is taken as an initial pressurization rate $v_{10}$ or initial depressurization rate $v_{20}$.

Here, in the initial value acquisition process, the initial pressurization rate or initial depressurization rate is usually determined from an empirical value according to the performance of the pressure switch 8; usually, the initial pressurization rate or initial depressurization rate is selected near the upper limit of the empirical value of pressurization rate or empirical value of depressurization rate, so as to approximate to the switching value of the pressure switch 8 as soon as possible and thereby reduce the detection time.

The pressurization rate or depressurization rate at the time of state switching of the pressure switch can be obtained by computing with a program; namely, the process from the time the pressure sensor 4 reads the pressure value in the pressure pipeline 3 to the next time the pressure sensor 4 reads the pressure value in the pressure pipeline 3 is used as a detection step, and the pressurization rate $v_{10}$ or depressurization rate $v_{20}$ at the time of state switching of the pressure switch is determined by subtracting the pressure value detected in the previous detection step from the pressure value detected at the time of state switching of the pressure switch and then dividing the result by the time used in the detection step; alternatively, if the pressure sensor 4 has a rate measurement function, the pressurization rate $v_{10}$ or depressurization rate $v_{20}$ at the time of state switching of the pressure switch may be recorded by the pressure sensor 4; or the pressurization rate or depressurization rate at the time of state switching of the pressure switch 8 may be set on the basis of an empirical value.

S20. Detected value acquisition step: acquiring a pressure value as a detected upper switching value $R_i$ and a corresponding pressurization rate $v_{1i}$ at the time of state switching of the pressure switch 8 in a pressurization process of the pressure switch 8, or acquiring a pressure value as a detected lower switching value $F_i$ and a corresponding depressurization rate $v_{2i}$ at the time of state switching of the pressure switch 8 in a depressurization process of the pressure switch 8, where i=1,2,3 . . . ;

In the above detected value acquisition step, in the process from the time the detection is commenced to the time of state switching of the pressure switch 8, the pressurization rate or depressurization rate may be any value within a reasonable range; preferably, the pressure in the pressure pipeline 3 is changed at a high pressurization rate or depressurization rate, which may be an approximately constant pressurization rate or depressurization rate or a varying pressurization rate or depressurization rate; for example, the pressurization rate or depressurization rate in the detected value acquisition step is a function of the detected pressure value in the pressure pipeline 3.

S30. Estimated value acquisition step: performing fitting estimation for the detected upper switching values (including the initial upper switching value) or the detected lower switching values (including the initial lower switching value) that were acquired in the last two or more times, and acquires an estimated upper switching value $\hat{R}_r$ or estimated lower switching value $\hat{F}_r$ of the pressure switch, where r=1,2,3 . . . .

In the estimated value acquisition step S30, fitting estimation may be performed with a polynomial fitting method based on least square, because, for a low order equation, the least square method utilizes an optimal square approximation scheme to approximate a function uniformly, and is simple and easy to use, and highly practical.

S40. Judgment step: comparing the difference between a maximum value and a minimum value between/among the estimated upper switching values or the estimated lower switching values acquired in the last two or more times with a specified value δ, and returning to the detected value acquisition step S20 if the difference is greater than or equal to the specified value δ; or taking the estimated upper switching value or the estimated lower switching value acquired in the last time as an upper switching value or lower switching value of the pressure switch, if the difference is smaller than the specified value δ.

In the judgment step S40 of the method, the difference between estimated switching values acquired in the last two times may be compared with the specified value δ to judge whether the method should be terminated, or the difference between a maximum value and a minimum value among the estimated switching values acquired in the last three or more times may be compared with the specified value δ to judge whether the method should be terminated, wherein, the specified value δ may be set according to the accuracy of the pressure switch 8 and the requirement for accuracy in the application scenario, and the specified value δ may be a fixed value or a non-fixed value; for example, the specified values δ used in the judgment steps in two detection processes may be different from each other; the switching value of the pressure switch obtained with the latter method has higher reliability, and accordingly the detection time may be longer. A trade-off may be made according to the detection requirement.

Optionally, the method may further comprise an initialization step before the step S10 to set the parameters involved in the method; for example, the specified value δ may be set; other parameters to be set may be determined according to the specific embodiment; that step may be neglected if the parameter values are fixed to default values.

Optionally, the method may further comprise an output step after the judgment step S40, i.e., recording the estimated upper switching value and estimated lower switching value obtained in the last cycle as upper switching value and lower switching value of the pressure switch 8 in the controller 5, and transmitting the result to the external device.

Different variants of the implementation process of the above-mentioned steps may be possible, according to different embodiments.

The method may be used to detect the upper switching value or lower switching value of a pressure switch 8 separately, and may also be used to detect the upper switching value and lower switching value of a pressure switch 8 at the same time.

Hereunder three different embodiments (embodiments 3-5) will be introduced in detail, in an example in which the upper switching value and lower switching value of a pressure switch are detected at the same time and the difference between a maximum value and a minimum value between the estimated switching values acquired in the last two times is compared with the specified value δ.

Embodiment 3: Constant Rate Pressure Control Method Based on Polynomial Fitting

FIG. 1 shows a device for detecting the switching value of a pressure switch. The pressure in the pressure pipeline 3 is changed at an approximately constant pressurization rate and depressurization rate in the detection process. The detection process comprises the following steps:

Initial value acquisition step: the pressure generator 1 changes the pressure in the pressure pipeline 3 at a high pressurization rate or depressurization rate, till ON-OFF state switching of the pressure switch 8 is detected; at that point, the pressure sensor 4 acquires the pressure value in the pressure pipeline 3 as an initial upper switching value $R_0$ or initial lower switching value $F_0$ and the corresponding initial pressurization rate $v_{10}$ or initial depressurization rate $v_{20}$ at the time of state switching of the pressure switch 8, and the acquired values are stored in the controller 5.

Detected value acquisition step: the pressure generator 1 increases the pressure in the pressure pipeline 3 from the lower switching value $F_{(i-1)}$ at a pressurization rate $V_i = \theta V_{1(i-1)}$, the upper switching value acquired by the pressure sensor 4 at the time of state switching of the pressure switch 8 is taken as a detected upper switching value $R_i$, and the pressurization rate $v_{1i}$ at the time of state switching of the pressure switch 8 is acquired; the pressure generator 1 decreases the pressure in the pressure pipeline 3 from the upper switching value $R_i$ at a depressurization rate $V_i \theta V_{2(i-1)}$, the lower switching value acquired by the pressure sensor 4 at the time of state switching of the pressure switch 8 is taken as a detected lower switching value $F_i$, the pressurization rate $v_{2i}$ at the time of state switching of the pressure switch 8 is acquired, and the acquired values are stored in the controller 5, where, i is the cycle index, θ is the rate adjustment factor, and i=1,2,3 . . . 0<θ<1.

Estimated value acquisition step: if i≥1, fitting estimation is performed for the detected upper switching values $R_i$ (including the initial upper switching value $R_0$) acquired in the last two times, and an estimated upper switching value $\hat{R}_r$ of the pressure switch is acquired; in addition, fitting estimation is performed for the detected lower switching values $F_r$ (including the initial lower switching value $F_0$) acquired in the last two times, and an estimated lower switching value $\hat{F}_r$ of the pressure switch is acquired; otherwise the cycle index i is incremented by 1, and the process turns to the detected value acquisition step, where, r is the estimation index, and =1,2,3 . . . .

Judgment step: If r≥2 and the following criterion is met: $\max(\hat{R}_{r-1}, \hat{R}_r) - \min(\hat{R}_{r-1}, \hat{R}_r) < \delta$ and $\max(\hat{F}_{r-1}, \hat{F}_r) - \min(\hat{F}_{r-1}, \hat{F}_r) < \delta$, then the detection is terminated, the estimated upper switching value and estimated lower switching value obtained in the last cycle are taken as upper switching value and lower switching value of the pressure switch 8 and stored in the controller 5, and the loop is exited; otherwise the cycle index i is incremented by 1, the estimation index r is incremented by 1, and the process turns to the detected value acquisition step, wherein, the value range of the specified value $\delta$ is 0.2-0.5 times of the accuracy of the pressure switch 8.

In the above method, if the parameters (e.g., specified value $\delta$ and the rate adjustment factor $\theta$) are to be set again, the embodiment may further comprise an initialization step; if the device is connected to an external device, the embodiment 3 may further comprise an output step.

In the above method, the number of cycles depends on the preset specified value $\delta$, rate adjustment factor $\theta$, and initial pressurization rate $v_{10}$ and/or initial depressurization rate $v_{20}$, etc.; in the detected value acquisition step of the method, the higher the rate adjustment factor $\theta$ is, the less the pressurization rate or depressurization rate is decreased in each time of detection, and thereby the shorter the required time is; however, in such a case, usually the times of detection required to reach required accuracy will be increased, and the total detection time will be longer accordingly; in contrast, the lower the rate adjustment factor $\theta$ is, the more the pressurization rate or depressurization rate is decreased in each time of detection; accordingly, usually the times of detection will be reduced, but the execution time in each time of detection will be longer. A trade-off must be made for the actual detection. Usually the specified value $\delta$ is set with reference to the nominal value of the pressure switch and the requirement for accuracy in the application scenario, and the value range may be 0.2-0.5 times of the accuracy of the pressure switch 8; the value range of the specified value $\delta$ being 0.2-0.5 times of the accuracy of the pressure switch 8 means that the specified value $\delta$ may be a fixed value or non-fixed value within a range of 0.2-0.5 times of the accuracy of the pressure switch 8; for example, the specified values $\delta$ used in the judgment steps in two detection processes may be different from each other.

Embodiment 4: Variable Rate Pressure Control Method Based on Polynomial Fitting

In order to further reduce the detection time while meeting the requirement for the repeatability index 15, the above-mentioned embodiment 3 of the method is improved by using real-time varying pressurization rate and depressurization rate in each time of detection, i.e., the pressure change rate is higher when the pressure is farther from the state switching point of the pressure switch, so as to save time; the pressure change rate is lower when the pressure is closer to the state switching point of the pressure switch, to reduce the detection error. In the detection process, the process from the time the pressure sensor 4 reads the pressure value in the pressure pipeline 3 to the next time the pressure sensor 4 reads the pressure value in the pressure pipeline 3 is used as a detection step; the process through which the detection of an upper switching value and an lower switching value of the pressure switch is accomplished is used as a cycle.

The steps included in the variable rate pressure control method in the embodiment 4 are essentially the same as the steps in the embodiment 3, except the rules under which the pressure generator 1 changes the pressure in the pressure pipeline 3 in the detected value acquisition step.

The detected value acquisition step in the embodiment 4 is as follows: Detected value acquisition step: the pressure generator 1 increases the pressure in the pressure pipeline 3 from the lower switching value $F_{i-1}$ at a pressurization rate $V_{ij} = \theta v_{1(i-1)} + k(R_{i-1} - p_j)$, the upper switching value acquired by the pressure sensor 4 at the time of state switching of the pressure switch 8 is taken as a detected upper switching value $R_i$, and the pressurization rate $v_{1i}$ at the time of state switching of the pressure switch 8 is acquired, where, i is the cycle index, i=1,2,3, . . . , j is the detection step index, j=1,2,3, . . . , k is the pressure adjustment factor, $\theta$ is the rate adjustment factor, 0<k, and 0<$\theta$<1; $p_j$ is the pressure value detected by the pressure sensor unit 3 in the detection step j; $v_{(i-1)}$ is the pressurization rate or initial pressurization rate at the time the detected upper switching value is acquired in the detected value acquisition step (i−1), and $R_{i-1}$ is the detected upper switching value or initial upper switching value detected in the detected value acquisition step i−1;

the pressure generator 1 decreases the pressure in the pressure pipeline 3 from the detected upper switching value $R_i$ at a depressurization rate $V_{ij} = \theta v_{2(i-1)} + k(p_j - F_{i-1})$, the lower switching value acquired by the pressure sensor 4 at the time of state switching of the pressure switch 8 is taken as a detected lower switching value $F_i$, and the pressurization rate $v_{2i}$ at the state switching of the pressure switch 8 is acquired; and the acquired values are stored in the controller 5; where, $p_j$ is the pressure value detected by the pressure sensor unit 3 in the detection step j; $v_{2(i-1)}$ is the depressurization rate or initial depressurization rate at the time of state switching of the pressure switch 8 in the detected value acquisition step (i−1), and $F_{i-1}$ is the detected lower switching value or initial lower switching value detected in the detected value acquisition step i−1.

Likewise, this embodiment may further comprise an initialization step and/or an output step.

The pressure in the pressure pipeline 3 is changed at a real-time varying pressurization rate or depressurization rate, the detected upper switching value or detected lower switching value of the pressure switch is detected, and the pressure adjustment factor k is a fixed value greater than zero. Likewise, usually the specified value $\delta$ is set with reference to the nominal value of the pressure switch and the requirement for accuracy in the application scenario, and the value range may be 0.2-0.5 times of the accuracy of the pressure switch 8; the value range of the specified value $\delta$ being 0.2-0.5 times of the accuracy of the pressure switch 8 means that the specified value $\delta$ may be a fixed value or non-fixed value within a range of 0.2-0.5 times of the accuracy of the pressure switch 8; for example, the specified values $\delta$ used in the judgment steps in two detection processes may be different from each other.

The method can further reduce the detection time so that the detected upper switching value or detected lower switching value approaches the true value quickly and achieves high consistency.

Embodiment 5: Fuzzy Pressure Control Method

In this embodiment, the controller 5 provide an instructive guideline for pressure increase/decrease in the pressure pipeline according to the pressure value acquired by the pressure sensor 4 and the state information of the pressure switch 8; the operator may operate the pressure generator 1 to accomplish the pressurization and depressurization process under the guidelines provided by the controller 5. The upper rate limit is divided into different rate ranges according to the upper limit of pressurization or depressurization of the pressure switch 8. For example, the guideline may be a fuzzy guideline, such as "low pressurization rate," "medium pressurization rate," "high pressurization rate," "low depressurization rate," "medium depressurization rate," or "high depressurization rate," etc.

Figure 10:
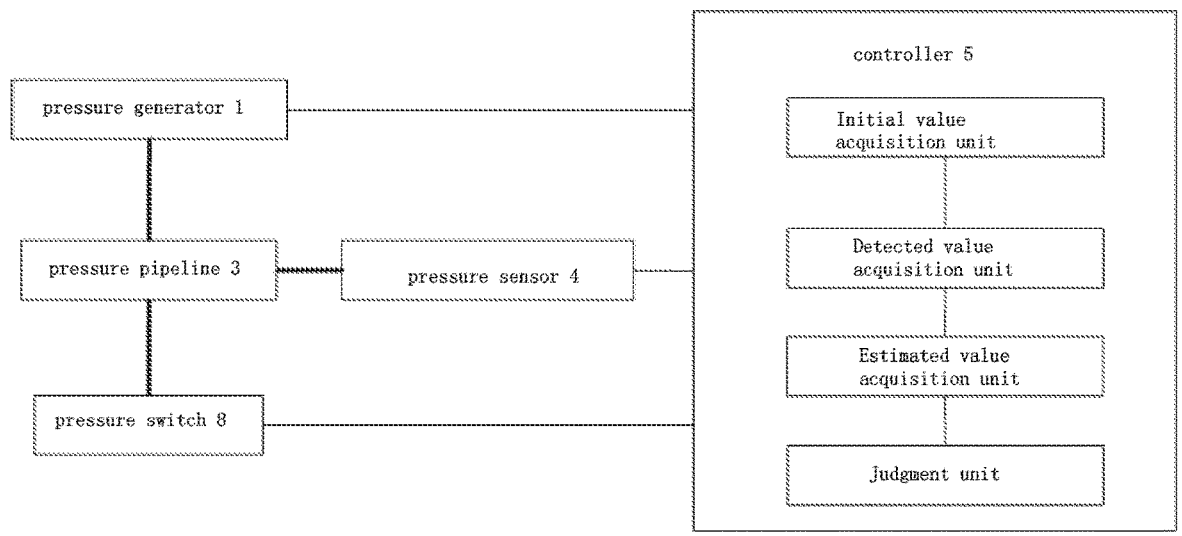
FIG. 10 is a block diagram of the structure of the device for detecting the switching value of a pressure switch corresponding to the Scheme I in the present invention.

Specifically, the method employs the device for detecting the switching value of a pressure switch shown in FIG. 1 or 10. In the detection process, the operator operates the pressure generator 1 under the guideline provided by the controller 5 to change the pressure in the pressure pipeline 3. The process comprises the following steps:

Initial value acquisition step: the pressure generator 1 is operated to change the pressure in the pressure pipeline 3 at a high pressurization rate or depressurization rate, till state switching of the pressure switch 8 is detected; at that point, the pressure sensor 4 acquires the pressure value in the pressure pipeline 3 as an initial upper switching value $R_0$ or initial lower switching value $F_0$ and the corresponding initial pressurization rate $v_{10}$ or initial depressurization rate $v_{20}$ at the time of state switching of the pressure switch 8, and the acquired values are stored in the controller 5.

Detected value acquisition step: the pressure generator 1 is operated to increase the pressure in the pressure pipeline 3 from the lower switching value $F_{(i-1)}$ under a fuzzy guideline provided by the controller 5, the upper switching value acquired by the pressure sensor 4 at the time of state switching of the pressure switch 8 is taken as a detected upper switching value $R_i$, and the pressurization rate $v_{1i}$ at the time of state switching of the pressure switch 8 is acquired; the pressure generator 1 decreases the pressure in the pressure pipeline 3 from the upper switching value $R_i$ under the fuzzy guideline provided by the controller 5, the lower switching value acquired by the pressure sensor 4 at the time of state switching of the pressure switch 8 is taken as a detected lower switching value $F_i$, the pressurization rate $v_{2i}$ at the time of state switching of the pressure switch 8 is acquired, and the acquired values are stored in the controller 5, where, i is the cycle index, θ is the rate adjustment factor, and i=1,2,3 . . . .

Estimated value acquisition step: if i≥1, fitting estimation is performed for the detected upper switching values $R_i$ (including the initial upper switching value $R_0$) acquired in the last two times, and an upper switching value $\hat{R}$ of the pressure switch is acquired; in addition, fitting estimation is performed for the detected lower switching values $F_i$ (including the initial lower switching value $F_0$) acquired in the last two times, and an estimated lower switching value $\hat{F}_r$ of the pressure switch is acquired; otherwise the cycle index i is incremented by 1, and the process turns to the detected value acquisition step, where, r is the estimation index, and r=1,2,3 . . . .

Judgment step: If r≥2 and the following criterion is met:

$$\max(\hat{R}_{r-1}, \hat{R}_r) - \min(\hat{R}_{r-1}, \hat{R}_r) < \delta \quad \text{and} \quad \max(\hat{F}_{r-1}, \hat{F}_r) - \min(\hat{F}_{r-1}, \hat{F}_r) < \delta,$$

then the detection is terminated, the estimated upper switching value and estimated lower switching value obtained in the last cycle are taken as upper switching value and lower switching value of the pressure switch 8 and stored in the controller 5, and the loop is exited; otherwise the cycle index i is incremented by 1, the estimation index r is incremented by 1, and the process turns to the detected value acquisition step, wherein, the value range of the specified value δ is 0.2-0.5 times of the accuracy of the pressure switch 8.

In the above method, if the parameters (e.g., specified value δ and the rate adjustment factor θ) are to be set again, the embodiment may further comprise an initialization step; if the device is connected to an external device 9, the embodiment may further comprise an output step.

Both Embodiment 3 and Embodiment 4 require the pressure generator 1 to exercise real-time control of the pressure in the pressure pipeline at a pressurization rate or depressurization rate provided by the controller 5, and usually require automatic measurement and control devices. They have advantages of quick, accurate control and convenience. Embodiment 5 is a simple implementation of the device described in the present invention, and it can also realize accurate measurement of the switching value of a pressure switch with the method in the present invention. It can work with most of existing pressure generators, and has advantages of simplicity, high practicality and low cost.

Embodiments

Hereunder experimental verification was carried out for the embodiments for detecting the switching value of a pressure switch according to the present invention. The tested pressure switch is a CATO pressure switch model PN30-P060G14H3AQ, the specific parameter indicators of which are shown in Table 1.

TABLE 1

List of Parameters of Tested Pressure Switch

| Tested Object | CATO electronic pressure switch |
|---|---|
| Model | PN30-P060G14H3AQ |
| Scale (kPa) | 6000 |
| Accuracy | 0.5% f.s (0.5% scale) |

In the experiments, the above-mentioned CATO pressure switch was used as the tested object. In the initial value acquisition step, pressure was increased or decreased at a fixed initial pressurization rate or depressurization rate of about 300 kPa/s, and thereby an initial upper switching value was obtained; the rate adjustment factor θ was within a range of 0.4~0.6, the pressure adjustment factor k was about 0.5, and the specified value δ was set to 6 kPa (0.1% scale).

Figure 5:
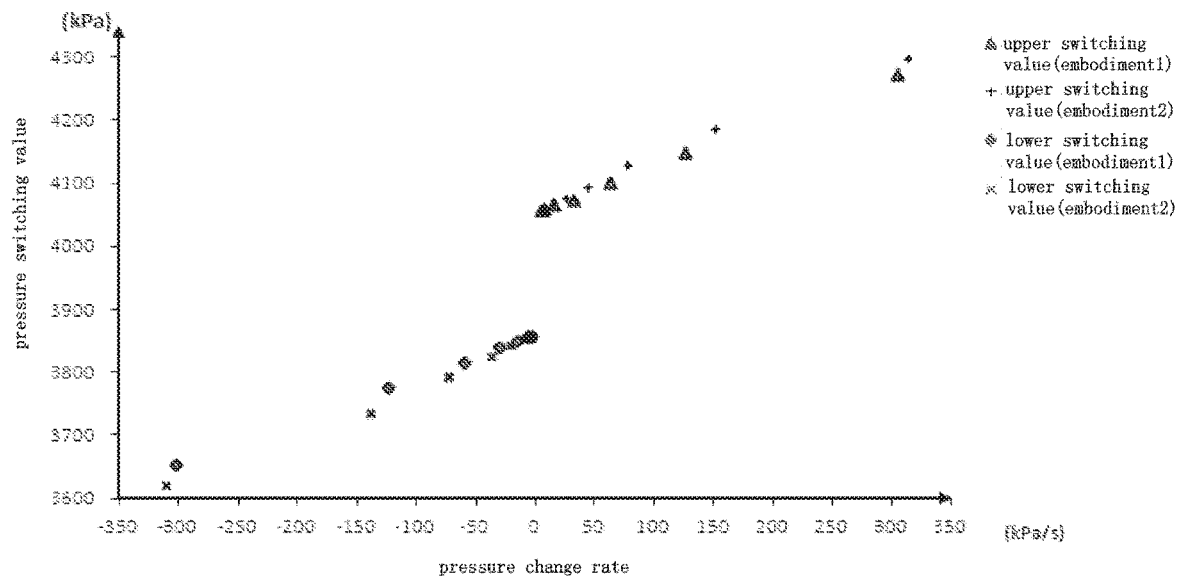
FIG. 5 is a diagram illustrating the relation between the pressure change rate and the detected pressure switching value in embodiment 1 and embodiment 2.

The detection results in the embodiment 1 and embodiment 2 are shown in Tables 2 and 3, and the relation between pressure change rate and detected pressure switching value is shown in FIG. 5. As shown in Tables 2 and 3, in the embodiment 1, the pressure in the pressure pipeline 3 was increased or decreased at a constant rate with a constant rate pressure control method, an upper switching value equal to 4,066 kPa was detected through 5 cycles, and the time consumed was 68.3 s; a lower switching value equal to 3,858 kPa was detected through 6 cycles, and the time consumed was 162.3 s; in the embodiment 2, a variable rate pressure control method was used, an upper switching value equal to 4,066 kPa was obtained through 6 cycles, and the time consumed was 33.7 s; a lower switching value equal to 3,852 kPa was detected through 6 cycles, and the time consumed was 53.5 s; in addition, the change rate at the time of state switching of the pressure switch 8 when the detection loop was terminated was reduced to a lower rate, and the difference between the detection results of the two embodiment is smaller than the specified value δ (6 kPa), which ensures the accuracy of the detection results; obviously, in the initial stage, the pressure scanning range is reduced from 0~6,000 kPa to about 3,620μ4,300 kPa quickly at a high pressure change rate (300 kPa/s), and thereby the detection time is shortened; in the embodiment 2, a variable rate method is used to accelerate the measurement process when the pressure is far from the switching value, and thereby the required detection time was much further reduced.

TABLE 2

Detection Result of Upper Switching Values in Embodiment 1 and Embodiment 2

| Detection process | Embodiment 1 | | | Embodiment 2 | | |
|---|---|---|---|---|---|---|
| | Pressurization rate $v_{1i}$ at upper switching value (kPa/s) | Initial upper switching value or detected upper switching value $R_i$ (kPa) | Time expended (s) | Pressurization rate $v_{1i}$ at upper switching value (kPa/s) | Initial upper switching value or detected upper switching value $R_i$ (kPa) | Time expended (s) |
| Initial value acquisition step: acquired initial value, i = 0 | 304.89 | 4274 | 2.9 | 313.15 | 4299 | 3.7 |
| Detected value acquisition step: detected value acquired in the first cycle, i = 1 | 126.14 | 4148 | 10.8 | 150.50 | 4186 | 10.1 |
| Detected value acquisition step: detected value acquired in the second cycle, i = 2 | 63.64 | 4101 | 21.7 | 77.10 | 4129 | 16.4 |
| Detected value acquisition step: detected value acquired in the third cycle, i = 3 | 31.95 | 4075 | 39.2 | 43.96 | 4093 | 24.1 |
| Detected value acquisition step: detected value acquired in the fourth cycle, i = 4 | 15.18 | 4066 | 68.3 | 25.97 | 4076 | 33.7 |
| Detected value acquisition step: detected value acquired in the fifth cycle, i = 5 | | | | 15.05 | 4066 | 45.5 |
| Judgment step: acquired switching value of pressure switch | | 4066 | 68.3 | | 4066 | 33.7 |

TABLE 3

Detection Result of Lower Switching Values in Embodiment 1 and Embodiment 2

| Detection process | Embodiment 1 | | | Embodiment 2 | | |
|---|---|---|---|---|---|---|
| | Depressurization rate $v_{2i}$ at lower switching value (kPa/s) | Initial lower switching value or detected lower switching value $F_i$ (kPa) | Time expended (s) | Depressurization rate $v_{2i}$ at lower switching value (kPa/s) | Initial lower switching value or detected lower switching value $F_i$ (kPa) | Time expended (s) |
| Initial value acquisition step: acquired initial value, i = 0 | −303.473 | 3653 | 5.8 | −310.806 | 3621 | 7.4 |
| Detected value acquisition step: detected value acquired in the first cycle, i = 1 | −124.262 | 3775 | 15.1 | −138.595 | 3736 | 13.2 |

TABLE 3-continued

Detection Result of Lower Switching Values in Embodiment 1 and Embodiment 2

| | Embodiment 1 | | | Embodiment 2 | | |
|---|---|---|---|---|---|---|
| Detection process | Depressurization rate $v_{2i}$ at lower switching value (kPa/s) | Initial lower switching value or detected lower switching value $F_i$ (kPa) | Time expended (s) | Depressurization rate $v_{2i}$ at lower switching value (kPa/s) | Initial lower switching value or detected lower switching value $F_i$ (kPa) | Time expended (s) |
| Detected value acquisition step: detected value acquired in the second cycle, i = 2 | −60.0587 | 3815 | 28.6 | −73.478 | 3794 | 20.4 |
| Detected value acquisition step: detected value acquired in the third cycle, i = 3 | −30.8414 | 3839 | 50.6 | −37.4146 | 3825 | 29.3 |
| Detected value acquisition step: detected value acquired in the fourth cycle, i = 4 | −16.6224 | 3850 | 89.9 | −21.4674 | 3842 | 40.2 |
| Detected value acquisition step: detected value acquired in the fifth cycle, i = 5 | −7.15904 | 3858 | 162.3 | −9.62977 | 3852 | 53.5 |
| Judgment step: acquired switching value of pressure switch | | 3858 | 162.3 | | 3852 | 53.5 |

Figure 6:
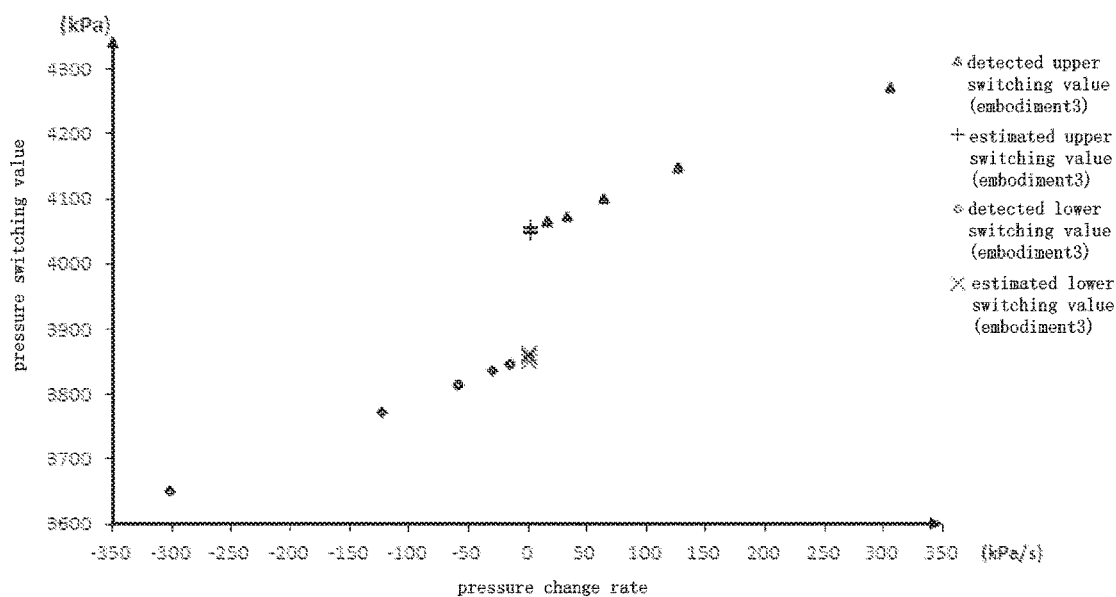
FIG. 6 is a diagram illustrating the relation between the pressure change rate and the detected pressure switching value in embodiment 3.
Figure 7:
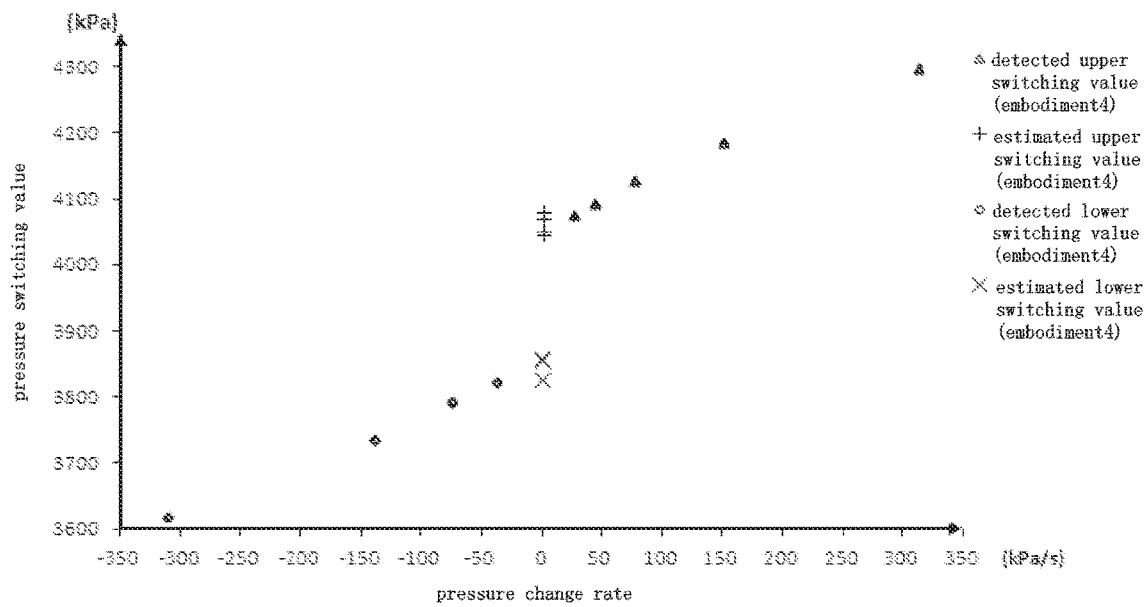
FIG. 7 is a diagram illustrating the relation between the pressure change rate and the detected pressure switching value in embodiment 4.
Figure 8:
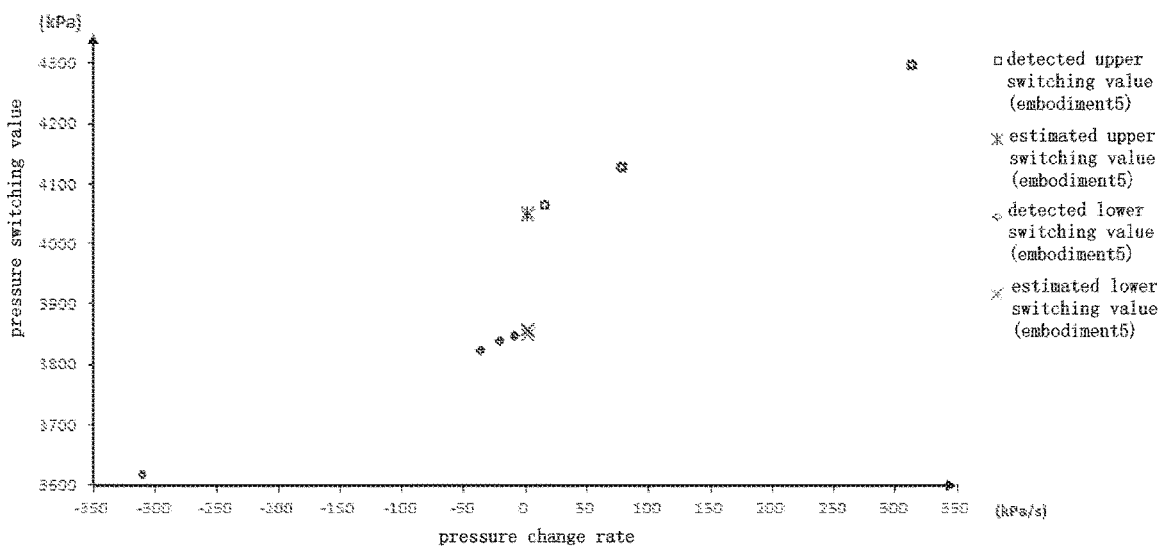
FIG. 8 is a diagram illustrating the relation between the pressure change rate and the detected pressure switching value in embodiment 5.

The detection results in the embodiment 3 are shown in Tables 4 and 5, and the relation between pressure change rate and detected pressure switching value is shown in FIG. 6; the detection results in the embodiment 4 are shown in Tables 6 and 7, and the relation between pressure change rate and detected pressure switching value is shown in FIG. 7; the detection results in the embodiment 5 are shown in Tables 8 and 9, and the relation between pressure change rate and detected pressure switching value is shown in FIG. 8.

As shown in Tables 4 and 7, in the embodiment 3, the pressure in the pressure pipeline 3 was increased or decreased at a constant rate with a constant rate pressure control method, an upper switching value equal to 4,049 kPa was detected through 4 cycles, and the time consumed was 39.2 s; a lower switching value equal to 3,863 kPa was detected through 5 cycles, and the time consumed was 89.9 s; in the embodiment 4, a variable rate pressure control method was used to increase or decrease the pressure in the pressure pipeline 3, an upper switching value equal to 4,051 kPa was obtained through 5 cycles, and the time consumed was 33.7 s; a lower switching value equal to 3858 kPa was detected through 4 cycles, and the time consumed was 29.3 s; in the two embodiments, the change rate at the time of state switching of the pressure switch 8 when the detection loop was terminated was reduced to a lower rate, and the difference between the detection results of the two embodiment was smaller than the specified value δ (i.e., 6 kPa), which ensures the accuracy of the detection results; obviously, in the initial stage, the pressure scanning range was reduced from 0~6,000 kPa to about 3,620~4,300 kPa quickly at a high pressure change rate (300 kPa/s), and thereby the detection time was shortened; in the embodiment 4, a variable rate method was used to accelerate the measurement process when the pressure was far from the switching value, and thereby the required detection time was further shortened greatly.

In the traditional manual detection method for detecting the switching value of the pressure switch 8, there is no specific requirement for the pressure change rate when the switching value of the pressure switch is detected. Consequently, it is difficult to ensure the uniformity and accuracy of the detection result on the basis of experience (see the detected switching value in the embodiment 5).

In the embodiment 5, a fuzzy pressure control method is used to increase or decrease the pressure in the pressure pipeline 3. With that method, it is unnecessary to gradually decrease the pressurization rate or depressurization rate, and the requirements for the operator are lower. The method is simpler to implement. As shown in Tables 8 and 9, an upper switching value equal to 4,050 kPa can be detected only through 3 cycles, and a lower switching value 3,859 kPa can be detected through 4 cycles. The difference between the result in this embodiment and the results in the embodiments 3 and 4 is smaller than the specified value δ, which ensures the accuracy of the detection result.

TABLE 4

Detection Result of Upper Switching Value in Embodiment 3

| | Embodiment 3 | | | |
| --- | --- | --- | --- | --- |
| Detection process | Pressurization rate $v_{1i}$ at upper switching value (kPa/s) | Initial upper switching value or detected upper switching value $R_i$ (kPa) | Estimated upper switching value $\hat{R}_r$ (kPa) | Time expended (s) |
| Initial value acquisition step: acquired initial value, i = 0 | 304.89 | 4274 | | 2.9 |
| Detected value acquisition step and estimated value acquisition step: value acquired in the first cycle, i = 1 | 126.14 | 4148 | 4059 | 10.8 |
| Detected value acquisition step and estimated value acquisition step: value acquired in the second cycle, i = 2 | 63.64 | 4101 | 4052 | 21.7 |
| Detected value acquisition step and estimated value acquisition step: value acquired in the third cycle, i = 3 | 31.95 | 4075 | 4049 | 39.2 |
| Judgment step: acquired switching value of pressure switch | | | 4049 | 39.2 |

TABLE 5

Detection Result of Lower Switching Value in Embodiment 3

| | Embodiment 3 | | | |
| --- | --- | --- | --- | --- |
| Detection process | Depressurization rate $v_{2i}$ at lower switching value (kPa/s) | Initial lower switching value or detected lower switching value $F_i$ (kPa) | Estimated lower switching value $\hat{F}_r$ (kPa) | Time expended (s) |
| Initial value acquisition step: acquired initial value, i = 0 | −303.473 | 3652.97 | | 5.8 |
| Detected value acquisition step and estimated value acquisition step: value acquired in the first cycle, i = 1 | −124.262 | 3775.46 | 3860 | 15.1 |
| Detected value acquisition step and estimated value acquisition step: value acquired in the second cycle, i = 2 | −60.0587 | 3815.41 | 3853 | 28.6 |
| Detected value acquisition step and estimated value acquisition step: value acquired in the third cycle, i = 3 | −30.8414 | 3839.32 | 3865 | 50.6 |
| Detected value acquisition step and estimated value acquisition step: value acquired in the fourth cycle, i = 4 | −16.6224 | 3850.10 | 3863 | 89.9 |
| Judgment step: acquired switching value of pressure switch | | | 3863 | 89.9 |

TABLE 6

Detection Result of Upper Switching Value in Embodiment 4

| | Embodiment 4 | | | |
| --- | --- | --- | --- | --- |
| Detection process | Pressurization rate $v_{1i}$ at upper switching value (kPa/s) | Initial upper switching value or detected upper switching value $R_i$ (kPa) | Estimated upper switching value $\hat{R}_r$ (kPa) | Time expended (s) |
| Initial value acquisition step: acquired initial value, i = 0 | 313.15 | 4299 | | 3.7 |
| Detected value acquisition step and estimated value acquisition step: value acquired in the first cycle, i = 1 | 150.50 | 4186 | 4081 | 10.1 |
| Detected value acquisition step and estimated value acquisition step: value acquired in the second cycle, i = 2 | 77.10 | 4129 | 4070 | 16.4 |
| Detected value acquisition step and estimated value acquisition step: value acquired in the third cycle, i = 3 | 43.96 | 4093 | 4046 | 24.1 |
| Detected value acquisition step and estimated value acquisition step: value acquired in the fourth cycle, i = 4 | 25.97 | 4076 | 4051 | 33.7 |
| Judgment step: acquired switching value of pressure switch | | | 4051 | 33.7 |

TABLE 7

Detection Result of Lower Switching Value in Embodiment 4

| | Embodiment 4 | | | |
|---|---|---|---|---|
| Detection process | Depressurization rate $v_{2i}$ at lower switching value (kPa/s) | Initial lower switching value or detected lower switching value $F_i$ (kPa) | Estimated lower switching value $\bar{F}_r$ (kPa) | Time expended (s) |
| Initial value acquisition step: acquired initial value, i = 0 | −310.806 | 3621 | | 7.4 |
| Detected value acquisition step and estimated value acquisition step: value acquired in the first cycle, i = 1 | −138.595 | 3736 | 3828 | 13.2 |
| Detected value acquisition step and estimated value acquisition step: value acquired in the second cycle, i = 2 | −73.478 | 3794 | 3859 | 20.4 |
| Detected value acquisition step and estimated value acquisition step: value acquired in the third cycle, i = 3 | −37.4146 | 3825 | 3858 | 29.3 |
| Judgment step: acquired switching value of pressure switch | | | 3858 | 29.3 |

TABLE 8

Detection Result of Upper Switching Value in Embodiment 5

| | Embodiment 5 | | |
|---|---|---|---|
| Detection process | Pressurization rate $V_{1i}$ at upper switching value (kPa/s) | Initial upper switching value or detected upper switching value $R_i$ (kPa) | Estimated upper switching value $\bar{R}_r$ (kPa) |
| Initial value acquisition step: acquired initial value, i = 0 | 313.15 | 4299.11 | |
| Detected value acquisition step and estimated value acquisition step: value acquired in the first cycle, i = 1 | 15.05 | 4065.59 | 4054 |
| Detected value acquisition step and estimated value acquisition step: value acquired in the second cycle, i = 2 | 77.10 | 4129.45 | 4050 |
| Judgment step: acquired switching value of pressure switch | | | 4050 |

TABLE 9

Detection Result of Lower Switching Value in Embodiment 5

| | Embodiment 5 | | |
|---|---|---|---|
| Detection process | Depressurization rate $v_{2i}$ at lower switching value (kPa/s) | Initial lower switching value or detected lower switching value $F_i$ (kPa) | Estimated lower switching value $\bar{F}_r$ (kPa) |
| Initial value acquisition step: acquired initial value, i = 0 | −9.63 | 3851.53 | |
| Detected value acquisition step and estimated value acquisition step: value acquired in the first cycle, i = 1 | −37.41 | 3825.00 | 3861 |
| Detected value acquisition step and estimated value acquisition step: value acquired in the second cycle, i = 2 | −310.81 | 3620.53 | 3853 |
| Detected value acquisition step and estimated value acquisition step: value acquired in the third cycle, i = 3 | −21.47 | 3842.40 | 3859 |
| Judgment step: acquired switching value of pressure switch | | | 3859 |

INDUSTRIAL APPLICABILITY

The present invention provides a device for detecting the switching value of a pressure switch, which can accomplish the detection of the switching value of a pressure switch, and is suitable for industrial manufacturing; the switching value of a pressure switch can be detected with the device through cyclic detection. The device not only realizes rapid detection, but also achieves high consistency and high accuracy, and is convenient to use and suitable for industrial application.

The invention claimed is:

1. A method for detecting a switching value of a pressure switch with a detection device, wherein, the detection device comprises a pressure generator that communicates with the pressure switch via a pressure pipeline, a pressure control element, a pressure sensor, and a controller with a data processing unit, wherein, the pressure sensor is installed on the pressure pipeline and electrically connected to the controller, the pressure control element is electrically connected to the pressure generator, configured to control the pressure generator, and electrically connected to the controller, the data processing unit of the controller is electrically connected to the pressure sensor and the pressure switch to acquire, analyze and process data, generate a corresponding control command, and transmit the control command via the pressure control element to the pressure generator, so as to adjust the pressure value in the pressure pipeline and thereby cause ON-OFF state switching of the pressure switch; the switching value of the pressure switch being detected with the method for detecting the switching value of a pressure switch;
the method for detecting the switching value of the pressure switch comprising the following steps:

an initial value acquisition step: acquiring, via the pressure sensor, a pressure value of the pressure switch as an initial upper switching value $R_0$ and a corresponding pressurization rate as an initial pressurization rate $v_{10}$ at the time of state switching of the pressure switch in a pressurization process of the pressure switch, or acquiring, via the pressure sensor, a pressure value of the pressure switch as an initial lower switching value $F_0$ and a corresponding depressurization rate as an initial depressurization rate $v_{20}$ at the time of state switching of the pressure switch in a depressurization process of the pressure switch, by the data processing unit of the controller;

a detected value acquisition step: transmitting, via the pressure control element, a command for adjusting (increasing or decreasing) the pressure in the pressure pipeline to the pressure generator, acquiring, via the pressure sensor, a pressure value of the pressure switch as a detected upper switching value $R_i$ and a corresponding pressurization rate $v_{1i}$ at the time of state switching of the pressure switch in the pressurization process of the pressure switch, or acquiring, via the pressure sensor, a pressure value as a detected lower switching value $F_i$ and a corresponding depressurization rate $v_{2i}$ at the time of state switching of the pressure switch in the depressurization process of the pressure switch by the data processing unit, where $i=1,2,3\ldots$;

a judgment step: comparing a difference between a maximum value and a minimum value between/among the detected upper switching values (including the initial upper switching value) or the detected lower switching values (including the initial lower switching value) that were acquired in the last two or more times with a specified value $\delta$, by the data processing unit, and returning to the detected value acquisition step if the difference is greater than or equal to the specified value $\delta$; or taking the detected upper switching value or detected lower switching value that was acquired in the last time as the upper switching value or lower switching value of the pressure switch and outputting that value, by the data processing unit, if the difference is smaller than the specified value $\delta$;

wherein, in the detected value acquisition step, the pressurization rate or depressurization rate is decreased from a pressurization rate $v_{1(i-1)}$ or depressurization rate $v_{2(i-1)}$ in a last time of state switching of the pressure switch, a rate adjustment value is added to the decreased pressurization rate or depressurization rate, and the resultant pressurization rate or depressurization rate is used to change the pressure in the pipeline;

wherein, in the detected value acquisition step, the rate adjustment value is decreased as the pressure value in the pressure pipeline is closer to the detected upper switching value (including the initial upper switching value) or the detected lower switching value (including the initial lower switching value) that was acquired in the last time; and wherein, the rate adjustment value is a function of the pressure value in the pipeline expressed by $\Delta V_{ij} = k(R_{i-1} - p_j)$, and the pressurization rate is expressed by $V_{ij} = \theta v_{1(i-1)} + \Delta V_{ij}$, where, $\Delta V_{ij}$ is the rate adjustment value in detection step j in the detected value acquisition step i, $V_{ij}$ is the pressurization rate in the detected value acquisition step i, $v_{1(i-1)}$ is the pressurization rate when the detected upper switching value was acquired in the detected value acquisition step (i-1), $R_{i-1}$ is the detected upper switching value detected in the detected value acquisition step (i-1), $p_j$ is the pressure value in the pressure pipeline detected in the detection step j, k is a pressure adjustment factor, $\theta$ is a rate adjustment factor, and $k \geq 0$, $0 < \theta < 1$, $i=1,2,3,\ldots$, $j=1, 2,3\ldots$.

2. The method for detecting the switching value of the pressure switch according to claim 1, wherein, the controller further comprises a storage unit, which is electrically connected to and interacts with the pressure control element and the pressure sensor, and has an interface with the data processing unit for data interaction; the data processing unit having data interaction with the storage unit.

3. The method for detecting the switching value of the pressure switch according to claim 1, wherein the detection device further comprises an electrical interface electrically connected to the controller, wherein the pressure switch transmits a switching action signal of the pressure switch to the controller via the electrical interface.

4. The method for detecting the switching value of the pressure switch according to claim 3, wherein the detection device further comprises an external device connected to the controller via the electrical interface, wherein the electrical interface is an integrated component that has different interfaces, including a digital signal interface, a USB interface, a serial interface, a wireless interface and an Ethernet interface, and the external device may be one or more of a computer, a liquid crystal display (LCD) and a touch screen.

5. The method for detecting the switching value of the pressure switch according to claim 1, wherein, in the detected value acquisition step, the data processing unit acquires a detected upper switching value $R_i$ and a pressurization rate $v_{1i}$ at the time of state switching of the pressure switch or acquires a detected lower switching value $F_i$ and a depressurization rate $v_{2i}$ at the time of state switching of the pressure switch via the pressure sensor, in a way that ensure the pressurization rate or depressurization rate at the time of state switching of the pressure sensor is smaller than the pressurization rate $v_{1(i-1)}$ or depressurization rate $v_{2(i-1)}$ in the last time of state switching of the pressure switch.

6. The method for detecting the switching value of the pressure switch according to claim 1, further comprising an estimated value acquisition step after the detected value acquisition step, wherein, in the estimated value acquisition step, the data processing unit performs fitting estimation for the detected upper switching values (including the initial upper switching value) or the detected lower switching values (including the initial lower switching value) that were acquired in the last two or more times, and acquires an estimated upper switching value $\hat{R}_r$ or estimated lower switching value $\hat{F}_r$ of the pressure switch, where $r=1,2, 3\ldots$.

7. The method for detecting the switching value of the pressure switch according to claim 6, wherein, in the estimated value acquisition step, fitting estimation is performed for the relation between detected upper switching value and pressurization rate or between detected lower switching value and depressurization rate with a polynomial fitting method based on least square, and a corresponding estimated switching value when the pressurization rate or depressurization rate of zero is taken as the estimated upper switching value or estimated lower switching value.

8. The method for detecting the switching value of the pressure switch according to claim 6, wherein, in the judgment step, the difference between a maximum value and a minimum value between/among the estimated upper switching values or estimated lower switching values acquired in the last two or more times is compared with a specified value δ, and the process returns to the detected value acquisition step if the difference is greater than or equal to the specified value δ; or the estimated upper switching value or the estimated lower switching value acquired in the last time is taken as the upper switching value or lower switching value of the pressure switch, if the difference is smaller than the specified value δ.

9. The method for detecting the switching value of the pressure switch according to claim 1, wherein, in the judgment step, the specified value δ is a preset accuracy, and its value is within a range of 0.2-0.5 times of the accuracy of the pressure switch.

10. The method for detecting the switching value of the pressure switch according to claim 1, wherein, in the initial value acquisition step, the pressure in the pressure pipeline changes at a high pressurization rate or depressurization rate, until ON-OFF state switching of the pressure switch is detected; at that point, the pressure value at the time of state switching of the pressure switch is acquired as an initial upper switching value $R_i$ or initial lower switching value $F_i$ and the pressurization rate or depressurization rate at the time of state switching of the pressure switch is taken as the initial pressurization rate $v_{1i}$ or initial depressurization rate $v_{2i}$.

11. A method for detecting a switching value of a pressure switch with a detection device,
   wherein, the detection device comprises a pressure generator, a pressure sensor, and a pressure pipeline, the pressure generator and the pressure sensor communicate with the pressure switch through the pressure pipeline, the pressure value in the pressure pipeline is adjusted via the pressure generator, so that the pressure switch is switched between an ON state and an OFF state, and the detection device detects the switching value of the pressure switch with the method for detecting the switching value of the pressure switch,
   the method for detecting the switching value of the pressure switch comprises the following steps:
   an initial value acquisition step: acquiring a pressure value of the pressure switch as an initial upper switching value $R_0$ and a corresponding pressurization rate as an initial pressurization rate $v_{10}$ at the time of state switching of the pressure switch in a pressurization process of the pressure switch, or acquiring a pressure value of the pressure switch as an initial lower switching value $F_0$ and a corresponding depressurization rate as an initial depressurization rate $v_{20}$ at the time of state switching of the pressure switch in a depressurization process of the pressure switch;
   a detected value acquisition step: acquiring a pressure value as a detected upper switching value $R_i$ $v_{1(i-1)}$ and a corresponding pressurization rate $v_{1i}$ $v_{2(i-1)}$ at the time of state switching in a pressurization process of the pressure switch, or acquiring a pressure value as a detected lower switching value $F_i$ $R_i$ and a corresponding depressurization rate $v_{2i}$ $v_{1i}$ at the time of state switching in a depressurization process of the pressure switch, in a way that ensures the pressurization rate or depressurization rate at the time of state switching of the pressure switch is smaller than the pressurization rate $v_{1(i-1)}$ $F_i$ or depressurization rate $v_{2(i-1)}$ $v_{2i}$ in a last time of state switching of the pressure switch, where i=1,2,3 . . . ;
   a judgment step: comparing a difference between a maximum value and a minimum value between/among the detected upper switching values (including the initial upper switching value) or the detected lower switching values (including the initial lower switching value) that were acquired in the last two or more times with a specified value δ, and returning to the detected value acquisition step if the difference is greater than or equal to the specified value δ; or taking the detected upper switching value or detected lower switching value that was acquired in the last time as the upper switching value or lower switching value of the pressure switch, if the difference is smaller than the specified value δ;
   wherein, in the detected value acquisition step, the pressurization rate or depressurization rate is decreased from a pressurization rate $v_{1(i-1)}$ or depressurization rate $v_{2(i-1)}$ in the last time of state switching of the pressure switch, a rate adjustment value is added to the decreased pressurization rate or depressurization rate, and the resultant pressurization rate or depressurization rate is used to change the pressure in the pipeline;
   wherein, in the detected value acquisition step, the rate adjustment value is decreased as the pressure value in the pressure pipeline is closer to the detected upper switching value (including the initial upper switching value) or the detected lower switching value (including the initial lower switching value) that was acquired in the last time; and
   wherein, the rate adjustment value is a function of the pressure value in the pipeline expressed by $\Delta V_{ij}=k(R_{i-1}-p_j)$, and the pressurization rate is expressed by $V_{ij}=\theta v_{1(i-1)}+\Delta V_{ij}$, where, $\Delta V_{ij}$ is the rate adjustment value in detection step j in the detected value acquisition step i, $V_{ij}$ is the pressurization rate in the detected value acquisition step i, $v_{1(i-1)}$ is the pressurization rate when the detected upper switching value was acquired in the detected value acquisition step (i−1), $R_{i-1}$ is the detected upper switching value detected in the detected value acquisition step (i−1), $p_j$ is the pressure value in the pressure pipeline detected in the detection step j, k is a pressure adjustment factor, θ is a rate adjustment factor, and k≥0, 0<θ<1, i=1,2,3, . . . , j=1,2,3, . . . .

12. The method for detecting the switching value of the pressure switch according to claim 11, wherein, in the judgment step, the specified value δ is a preset accuracy, and its value is within a range of 0.2-0.5 times of the accuracy of the pressure switch.

13. The method for detecting the switching value of the pressure switch according to claim 11, wherein, in the initial value acquisition step, the pressure in the pressure pipeline changes at a high pressurization rate or depressurization rate, until ON-OFF state switching of the pressure switch is detected; at that point, the pressure value at the time of state switching of the pressure switch is acquired as an initial upper switching value $R_i$ or initial lower switching value $F_i$, and the pressurization rate or depressurization rate at the time of state switching of the pressure switch is taken as the initial pressurization rate $v_{1i}$ or initial depressurization rate $v_{2i}$.

14. A method for detecting a switching value of a pressure switch with a detection device,
   wherein, the detection device comprises a pressure generator, a pressure sensor, and a pressure pipeline, the pressure generator and the pressure sensor communicate with the pressure switch through the pressure pipeline, the pressure value in the pressure pipeline is adjusted via the pressure generator, so that the pressure switch is switched between an ON state and an OFF state, and the detection device detects the switching value of the pressure switch with the method for detecting the switching value of the pressure switch, the method for detecting the switching value of the pressure switch comprises the following steps:

an initial value acquisition step for acquiring a pressure value of the pressure switch as an initial upper switching value $R_0$ and a corresponding pressurization rate as an initial pressurization rate $v_{10}$ at the time of state switching of the pressure switch in a pressurization process of the pressure switch, or acquiring a pressure value of the pressure switch as an initial lower switching value $F_0$ and a corresponding depressurization rate as an initial depressurization rate $v_{20}$ at the time of state switching of the pressure switch in a depressurization process of the pressure switch;

a detected value acquisition step for acquiring a pressure value as a detected upper switching value $R_i$ and a corresponding pressurization rate $v_{1i}$ at the time of state switching of the pressure switch in a pressurization process of the pressure switch, or acquiring a pressure value as a detected lower switching value $F_i$ and a corresponding depressurization rate $v_{2i}$ at the time of state switching of the pressure switch in a depressurization process of the pressure switch, where i=1,2, 3 . . . ;

an estimated value acquisition step for performing fitting estimation for the detected upper switching values (including the initial upper switching value) or the detected lower switching values (including the initial lower switching value) that were acquired in the last two or more times, and acquires an estimated upper switching value $\hat{R}_r$ or estimated lower switching value $\hat{F}_r$ of the pressure switch, where r=1,2,3 . . . ;

a judgment step for comparing the difference between a maximum value and a minimum value between/among the estimated upper switching values or the estimated lower switching values acquired in the last two or more times with a specified value δ, and returning to the detected value acquisition step if the difference is greater than or equal to the specified value δ; or taking the estimated upper switching value or the estimated lower switching value acquired in the last time as an upper switching value or lower switching value of the pressure switch, if the difference is smaller than the specified value δ;

wherein, in the detected value acquisition step, the pressurization rate or depressurization rate is decreased from a pressurization rate $v_{1(i-1)}$ or depressurization rate $v_{2(i-1)}$ in a last time of state switching of the pressure switch, a rate adjustment value is added to the decreased pressurization rate or depressurization rate, and the resultant pressurization rate or depressurization rate is used to change the pressure in the pipeline;

wherein, in the detected value acquisition step, the rate adjustment value is decreased as the pressure value in the pressure pipeline is closer to the detected upper switching value (including the initial upper switching value) or the detected lower switching value (including the initial lower switching value) that was acquired in the last time; and wherein, the rate adjustment value is a function of the pressure value in the pipeline expressed by $\Delta V_{ij} = k(R_{i-1} - p_j)$, and the pressurization rate is expressed by $V_{ij} = \theta v_{1(i-1)} + \Delta V_{ij}$, where, $\Delta V_{ij}$ is the rate adjustment value in detection step j in the detected value acquisition step i, $V_{ij}$ is the pressurization rate in the detected value acquisition step i, $v_{1(i-1)}$ is the pressurization rate when the detected upper switching value was acquired in the detected value acquisition step (i−1), $R_{i-1}$ is the detected upper switching value detected in the detected value acquisition step (i−1), $p_j$ is the pressure value in the pressure pipeline detected in the detection step j, k is a pressure adjustment factor, θ is a rate adjustment factor, and k≥0, 0<θ<1 i=1,2,3, . . . , j=1,2,3 . . . .

15. The method for detecting the switching value of the pressure switch according to claim 14, wherein, in the estimated value acquisition step, fitting estimation is performed based on the relation between the detected upper switching value and pressurization rate or between the detected lower switching value and depressurization rate with a polynomial fitting method based on least square, and a corresponding estimated switching value when the pressurization rate or depressurization rate of zero is taken as an estimated upper switching value or estimated lower switching value.

16. The method for detecting the switching value of the pressure switch according to claim 14, wherein, in the detected value acquisition step, a detected upper switching value $R_i$ or detected lower switching value $F_i$ at the time of state switching of the pressure switch is acquired in a way that ensures the pressurization rate or depressurization rate at the time of state switching of the pressure switch is different from the pressurization rate $v_{1(i-1)}$ or depressurization rate $v_{2(i-1)}$ in the last time of state switching of the pressure switch.

17. The method for detecting the switching value of the pressure switch according to claim 14, wherein, in the judgment step, the specified value δ is a preset accuracy, and its value is within a range of 0.2-0.5 times of the accuracy of the pressure switch.

18. The method for detecting the switching value of the pressure switch according to claim 14, wherein, in the initial value acquisition step, the pressure in the pressure pipeline changes at a high pressurization rate or depressurization rate, until ON-OFF state switching of the pressure switch is detected; at that point, the pressure value at the time of state switching of the pressure switch is acquired as an initial upper switching value $R_i$ or initial lower switching value $F_i$, and the pressurization rate or depressurization rate at the time of state switching of the pressure switch is taken as the initial pressurization rate $v_{1i}$ or initial depressurization rate $v_{2i}$.

19. A device for detecting the switching value of a pressure switch, comprising a pressure generator, a pressure sensor, and a pressure pipeline, wherein, the pressure generator and the pressure sensor communicate with the pressure switch through the pressure pipeline, the pressure value in the pressure pipeline is adjusted via the pressure generator, so that the pressure switch is switched between an ON state and an OFF state; wherein, the device further comprises an initial value acquisition unit, a detected value acquisition unit, and a judgment unit, wherein:

the initial value acquisition unit controls the pressure generator to change the pressure in the pressure pipeline, acquires a pressure value as an initial upper switching value $R_0$ and a corresponding pressurization rate as an initial pressurization rate $v_{10}$ at the time of state switching of the pressure switch in a pressurization process of the pressure switch, or acquires a pressure value as an initial lower switching value $F_0$ and a corresponding depressurization rate as an initial depressurization rate $v_{20}$ at the time of state switching of the pressure switch in a depressurization process of the pressure switch;

the detected value acquisition unit controls the pressure generator to change the pressure in the pressure pipeline, acquires a pressure value as a detected upper switching value $R_i$ $v_{1(i-1)}$ and a corresponding pressurization rate $v_{1i}$ $v_{2(i-1)}$ at the time of state switching of the pressure switch in a pressurization process of the pressure switch or acquires a pressure value as a detected lower switching value $F_i$ $R_i$ and a corresponding depressurization rate $v_{2i}$ $v_{1i}$ at the time of state switching of the pressure switch in a depressurization process of the pressure switch, in a way that ensures the pressurization rate or depressurization rate at the time of state switching of the pressure switch is smaller than the pressurization rate $v_{1(i-1)}$ $F_i$ or depressurization rate $v_{2(i-1)}$ $v_{2i}$ in a last time of state switching of the pressure switch, where i=1,2,3 . . . ;

the judgment unit receives the data values acquired by the detected value acquisition unit, compares the difference between a maximum value and a minimum value between/among detected upper switching values (including the initial upper switching value) or detected lower switching values (including the initial lower switching value) that were acquired in the last two or more times with a specified value $\delta$, and instructs the detected value acquisition unit to perform the next time of acquisition operation if the difference is greater than or equal to the specified value $\delta$; or takes the detected upper switching value or detected lower switching value that was acquired in the last time as the upper switching value or lower switching value of the pressure switch, if the difference is smaller than the specified value $\delta$;

wherein, in the detected value acquisition unit, the pressurization rate or depressurization rate is decreased from a pressurization rate $v_{1(i-1)}$ or depressurization rate $v_{2(i-1)}$ in the last time of state switching of the pressure switch, a rate adjustment value is added to the decreased pressurization rate or depressurization rate, and the resultant pressurization rate or depressurization rate is used to change the pressure in the pipeline;

wherein, in the detected value acquisition unit, the rate adjustment value is decreased as the pressure value in the pressure pipeline is closer to the detected upper switching value (including the initial upper switching value) or the detected lower switching value (including the initial lower switching value) that was acquired in the last time; and wherein, the rate adjustment value is a function of the pressure value in the pipeline expressed by $\Delta V_{ij} = k(R_{i-1} - p_j)$, and the pressurization rate is expressed by $V_{ij} = \theta v_{1(i-1)} + \Delta V_{ij}$, where, $\Delta V_{ij}$ is the rate adjustment value in detection step j in the detected value acquisition step i, $V_{ij}$ is the pressurization rate in the detected value acquisition step i, $v_{1(i-1)}$ is the pressurization rate when the detected upper switching value was acquired in the detected value acquisition step (i−1), $R_{i-1}$ is the detected upper switching value detected in the detected value acquisition step (i−1), $p_j$ is the pressure value in the pressure pipeline detected in the detection step j, k is a pressure adjustment factor, $\theta$ is a rate adjustment factor, and k≥0, 0<$\theta$<1, i=1,2,3, . . . , j=1,2,3, . . . .

20. A device for detecting a switching value of a pressure switch, comprising a pressure generator, a pressure sensor, and a pressure pipeline, wherein, the pressure generator and the pressure sensor communicate with the pressure switch through the pressure pipeline, the pressure value in the pressure pipeline is adjusted via the pressure generator, so that the pressure switch is switched between an ON state and an OFF state; wherein, the device further comprises an initial value acquisition unit, a detected value acquisition unit, an estimated value acquiring unit, and a judgment unit, wherein:

the initial value acquisition unit controls the pressure generator to change the pressure in the pressure pipeline, acquires a pressure value as an initial upper switching value $R_0$ and a corresponding pressurization rate as an initial pressurization rate $v_{10}$ at the time of state switching of the pressure switch in a pressurization process of the pressure switch, or acquires a pressure value as an initial lower switching value $F_0$ and a corresponding depressurization rate as an initial depressurization rate $v_{20}$ at the time of state switching of the pressure switch in a depressurization process of the pressure switch;

the detected value acquisition unit controls the pressure generator to change the pressure in the pressure pipeline, acquires a pressure value as a detected upper switching value $R_i$ and a corresponding pressurization rate $v_{1i}$ at the time of state switching of the pressure switch in a pressurization process of the pressure switch, or acquires a pressure value as a detected lower switching value $F_i$ and a corresponding depressurization rate $v_{2i}$ at the time of state switching of the pressure switch in a depressurization process, where i=1,2, 3 . . . ;

the estimated value acquiring unit receives the data values acquired by the detected value acquisition unit, performs fitting estimation for the detected upper switching values (including the initial upper switching value) or the detected lower switching values (including the initial lower switching value) that were acquired in the last two or more times, and acquires an estimated upper switching value $\overset{\prime}{R}_r$ or estimated lower switching value $\overset{\prime}{F}_r$ of the pressure switch, where r=1,2,3 . . . ;

the judgment unit receives the data values acquired by the estimated value acquisition unit, compares the difference between a maximum value and a minimum value between/among estimated upper switching values or the estimated lower switching values that were acquired in the last two or more times with a specified value $\delta$, and instructs the detected value acquisition unit to perform the next time of acquisition operation if the difference is greater than or equal to the specified value $\delta$; or takes the estimated upper switching value or the estimated lower switching value acquired in the last time as an upper switching value or lower switching value of the pressure switch, if the difference is smaller than the specified value $\delta$;

wherein, in the detected value acquisition unit, the pressurization rate or depressurization rate is decreased from a pressurization rate $v_{1(i-1)}$ or depressurization rate $v_{2(i-1)}$ in a last time of state switching of the pressure switch, a rate adjustment value is added to the decreased pressurization rate or depressurization rate, and the resultant pressurization rate or depressurization rate is used to change the pressure in the pipeline;

wherein, in the detected value acquisition unit, the rate adjustment value is decreased as the pressure value in the pressure pipeline is closer to the detected upper switching value (including the initial upper switching value) or the detected lower switching value (including the initial lower switching value) that was acquired in the last time; and wherein, the rate adjustment value is a function of the pressure value in the pipeline expressed by $\Delta V_{ij} = k(R_{i-1} - p_j)$, and the pressurization rate is expressed by $V_{ij} = \theta v_{1(i-1)} + \Delta V_{ij}$, where, $\Delta V_{ij}$ is the rate adjustment value in detection step j in the detected value acquisition step i, $V_{ij}$ is the pressurization rate in the detected value acquisition step i, $v_{1(i-1)}$ is the pressurization rate when the detected upper switching value was acquired in the detected value acquisition step (i−1), $R_{i-1}$ is the detected upper switching value detected in the detected value acquisition step (i−1), $p_j$ is the pressure value in the pressure pipeline detected in the detection step j, k is a pressure adjustment factor, $\theta$ is a rate adjustment factor, and $k \geq 0$, $0 < \theta < 1$, $i = 1,2,3, \ldots$, $j = 1,2,3, \ldots$.

* * * * *